United States Patent
Dhage et al.

(10) Patent No.: US 10,862,826 B2
(45) Date of Patent: Dec. 8, 2020

(54) HOST POLICY MANAGEMENT IN A NETWORK FABRIC OF INTERCONNECTED SWITCHES FOR IP MULTICAST TRAFFIC DELIVERY

(71) Applicant: Cisco Technology, Inc., San Jose, CA (US)

(72) Inventors: Vaibhav Dhage, San Jose, CA (US); Varun Manchanda, San Jose, CA (US); Rishi Chhibber, Dublin, CA (US); Meo Francesco, San Jose, CA (US); Roshan Lal, San Jose, CA (US); Padmanab Pathikonda, Mountain House, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/273,496

(22) Filed: Feb. 12, 2019

(65) Prior Publication Data
US 2020/0259764 A1    Aug. 13, 2020

(51) Int. Cl.
| G06F 15/173 | (2006.01) |
| H04L 12/911 | (2013.01) |
| H04L 12/933 | (2013.01) |
| H04L 12/801 | (2013.01) |
| H04L 12/813 | (2013.01) |

(52) U.S. Cl.
CPC .......... *H04L 47/829* (2013.01); *H04L 47/15* (2013.01); *H04L 47/20* (2013.01); *H04L 47/822* (2013.01); *H04L 49/15* (2013.01)

(58) Field of Classification Search
CPC ....... H04L 47/829; H04L 47/15; H04L 47/20; H04L 47/822; H04L 49/15

USPC ........................................................ 709/226
See application file for complete search history.

(56) References Cited

U.S. PATENT DOCUMENTS

| 8,028,082 | B2 | 9/2011 | Hooda et al. |
| 2003/0081559 | A1 | 5/2003 | Matuoka et al. |
| 2006/0146857 | A1* | 7/2006 | Naik ...................... H04L 47/20 370/432 |
| 2014/0016501 | A1* | 1/2014 | Kamath .................. H04L 45/64 370/253 |
| 2016/0337265 | A1* | 11/2016 | Brar .................... H04L 49/1515 |
| 2016/0366019 | A1 | 12/2016 | Pani et al. |
| 2018/0062990 | A1 | 3/2018 | Kumar et al. |
| 2018/0063003 | A1 | 3/2018 | Mekkattuparamban et al. |

OTHER PUBLICATIONS

Cisco, White Paper, "Cisco IP Fabric for Media", Design Guide, Sep. 2018, 47 pages.

* cited by examiner

*Primary Examiner* — Atta Khan
(74) *Attorney, Agent, or Firm* — Edell, Shapiro & Finnan, LLC

(57) ABSTRACT

In one illustrative example, a switch for use in a network fabric which includes a plurality on interconnected switches configured to facilitate communication of IP multicast traffic amongst host devices may be provided. The switch may receive, from a controller, a global set of host policies associated with the plurality of switches of the network fabric. The switch may select, from the global set of host policies, a local subset of host policies applicable to the switch. The switch may grant or deny admission of host devices to receive or send IP multicast traffic flows in the network fabric according to the selected, local subset of host policies.

20 Claims, 20 Drawing Sheets

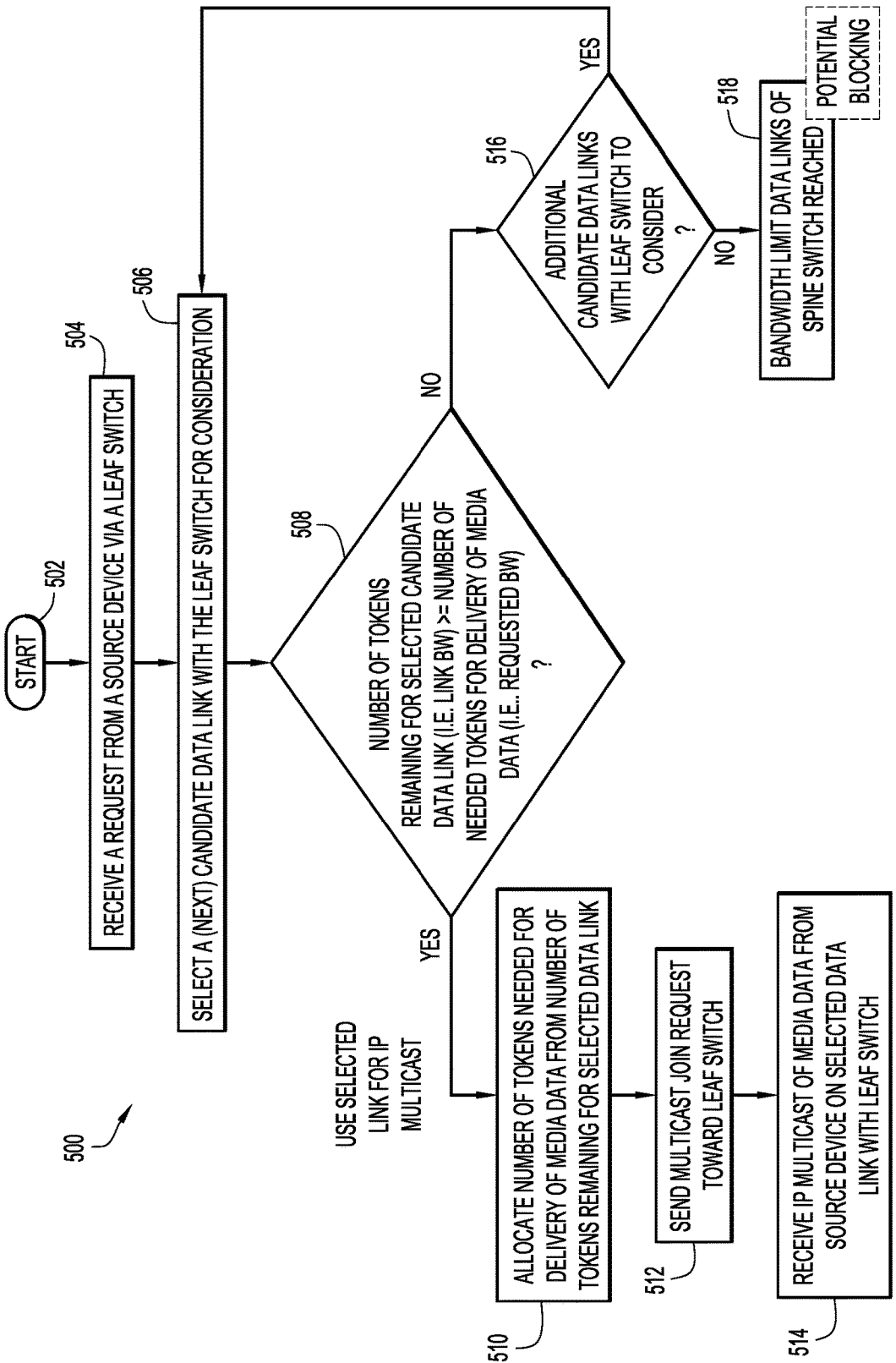

POST: {{ip}}/<...>/conf/hostpolicytable.json

BODY:
{
  "HostPolicyTable": {
    "children":[

{"HostPolicy" : {"attributes" : {"host":"153.0.0.4", "source":"32.0.0.1", "group":"225.1.1.1", "mask":"32", "role": "SENDER, "permission":"ALLOWED"}}

{"HostPolicy" : {"attributes" : {"host":"153.0.0.4", "source":"32.0.0.1", "group":"225.1.1.1", "mask":"32", "role": "RECEIVER, "permission":"ALLOWED"}}

<...>
]
}
}

HOST POLICY
(EXAMPLE IN JSON FORMAT)
1002

FIG.10

HOST POLICY MANAGEMENT IN A NETWORK FABRIC OF INTERCONNECTED SWITCHES FOR IP MULTICAST TRAFFIC DELIVERY

TECHNICAL FIELD

The present disclosure relates to host policy management in a network fabric which includes a plurality of interconnected switches configured to facilitate communication of IP multicast traffic amongst host devices.

BACKGROUND

A network fabric may include a plurality of interconnected switches configured to facilitate communication of IP multicast traffic amongst host devices. In such a network fabric, the management of host admission policies may be relatively complex and tedious, requiring a user to maintain a per-switch configuration and track all host-facing interfaces and their assigned addresses. In a network fabric configured to provide "guaranteed" bandwidths for IP multicast traffic flows, host policy management becomes increasingly important, as spurious flows that are provisioned with bandwidth may undesirably block subsequent host requests.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5A is a flowchart for describing a method of operation of a spine switch for source device participation in the IP network media data router of FIG. 3, for use in providing a guaranteed non-blocking IP multicast delivery of media data;

FIG. 10 is an example of data of a host admission policy which may be used in some implementation of the present disclosure;

DESCRIPTION OF EXAMPLE EMBODIMENTS

Figure 1A:
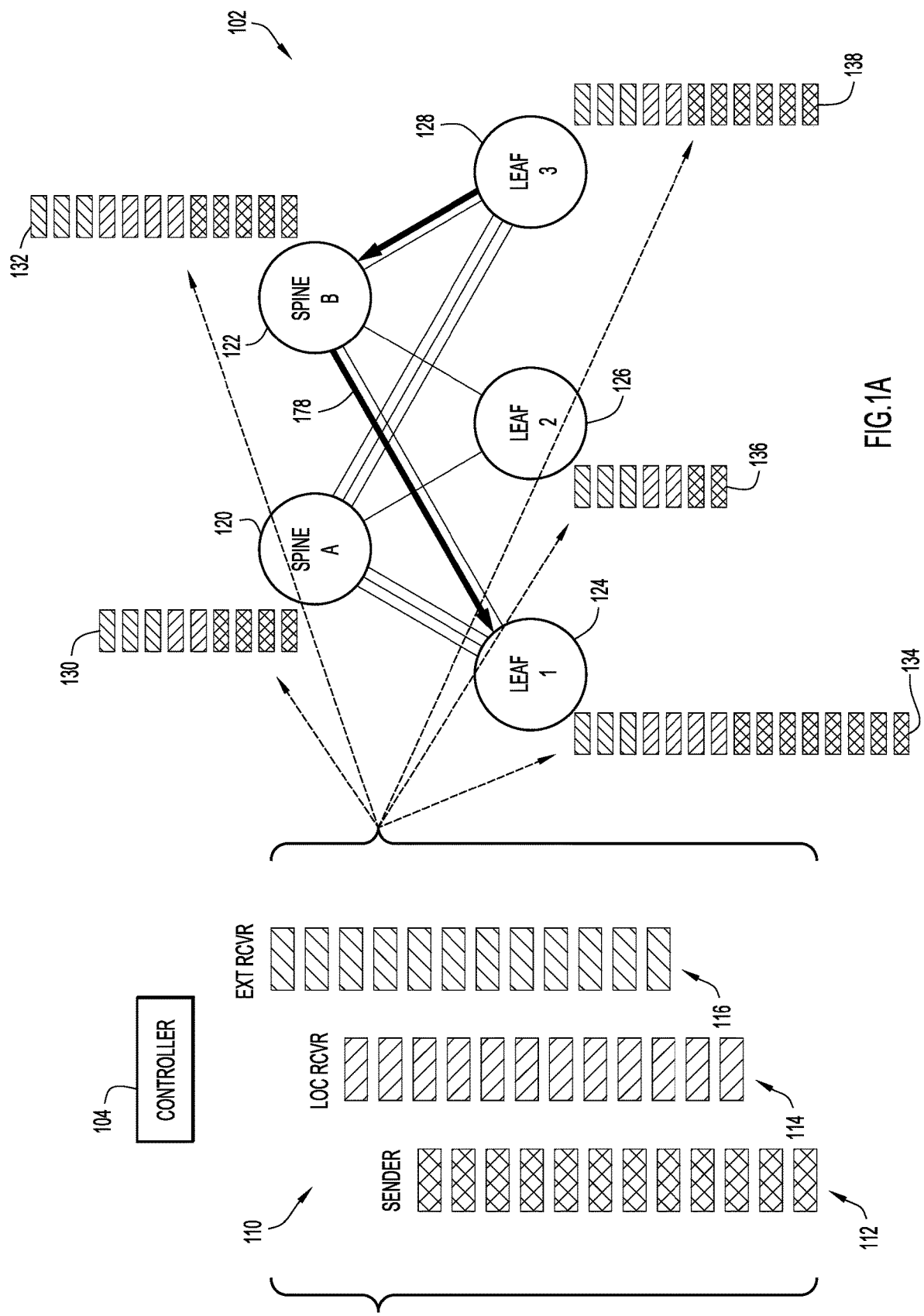
FIGS. 1A-1C are illustrative representations of a network fabric which includes a plurality of interconnected switches and a controller, for describing scenarios using a technique for host policy management.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques for use in host policy management in a network fabric which includes a plurality of interconnected switches configured to facilitate communication of IP multicast traffic amongst host devices are described herein.

In one illustrative example of the present disclosure, a switch for use in the network fabric may receive, from a controller, a global set of host policies associated with the plurality of switches of the network fabric. The switch may select, from the global set of host policies, a local subset of host policies applicable to the switch. The switch may then grant or deny admission of host devices to receive or send IP multicast traffic flows in the network fabric according to the selected, local subset of host policies.

In some implementations, each one of the host policies (e.g. at least many or most) may include a host IP address corresponding to a host device and a permission type which indicates "allowed" or "denied." In the selection or filtering process at each switch, for each one of a plurality of host policies of the global set, a host IP address associated with the host policy and a subnet IP address of an interface of the switch may be compared, where a host policy is included in the local subset based on the comparing.

In some implementations, the switch may retain host sender policies of the global set, for use in granting or denying admission of host receiver devices to receive IP multicast traffic flows according to the host sender policies of the global set. Also in some implementations, at least some host policies may be applicable to all of the switches (e.g. on all interfaces) in the network fabric; such a host policy may be referred to as a "wildcard" host policy, where there is no specific host IP address associated therewith.

In another illustrative example of the present disclosure, a controller for use in the network fabric may generate (and/or maintain) a global set of host policies associated with the plurality of switches of the network fabric. The controller may then push or otherwise send the global set of host policies to each switch of the plurality of switches. Upon receipt, each switch of the network fabric may operate to filter the global set of host policies to select a local subset of host policies applicable to the switch.

More detailed and alternative techniques and implementations are provided herein as described below.

Example Embodiments

In a network fabric having a plurality of interconnected switches configured to facilitate communication of IP multicast traffic, conventional techniques to facilitate host admission policy and updates may be challenging and prone to errors.

What are described herein are robust policy application schemes that are extremely simple for an administrator to configure and may be self-adapting to system changes.

According to some implementations of the present disclosure, the same global set of host policies are pushed to all of the switches in the network fabric, where each switch may create its own locally-applicable subset. In response to a change in the network (e.g. a topology change, link migration, IP address configuration change, or other), each switch may automatically update and apply its own updated subset of policies. Further, a consulting of corresponding sender host policies on a receiver switch may avoid unnecessary flow programming and resource waste. As the host policies and their application are in software, there are no hardware limitations as there is no dependence on access control lists (ACLs).

To better illustrate prior host policy management techniques in FIG. 1A, a network fabric 102 may include a plurality of interconnected switches (e.g. switches 120, 122, 124, 126, and 128) configured to facilitate communication of IP multicast traffic amongst host devices. In the example of FIG. 1A, the switches 120-128 are interconnected in a spine and leaf node architecture configuration, where switches 120 and 122 are spine node switches, and switches 124, 126, and 128 are leaf node switches.

A controller 104 may maintain a plurality of host admission policies 110, which may include sender host policies 112, receiver host policies 114, and external receiver host policies 116. Host policy management of host policies 110 requires a per-switch configuration and tracking of all host-facing interfaces and their assigned addresses. An administrator may go through the network fabric 102 and select the interfaces and apply the appropriate host policies to these interfaces.

Here, controller 104 may be used to send the appropriate per-switch host policies to each one of switches 120, 122, 124, 126, and 128. In FIG. 1A, for example, controller 104 may send one or more host policies 130 that are applicable to switch 120, one or more host policies 132 that are applicable to switch 122, one or more host policies 134 that are applicable to switch 124, one or more host policies 136 that are applicable to switch 126, and one or more host policies 138 that are applicable to switch 128. As is apparent, the management of host admission policies may be relatively complex and tedious, requiring a user to maintain the per-switch configuration and track all host-facing interfaces and their assigned addresses.

Also, each time a network change occurs, the administrator has to revisit the affected interfaces and reconfigure the host policies as needed. When the administrator detects an unwelcome flow in the network fabric, in order to remove the flow, one needs to identify the specific interfaces where the offending endpoints are connected and apply deny policies there. Similarly, in order to allow a previously-denied flow, one needs to go to the interface where the source will be connected (as well as each interface where a receiver is expected) and apply a permit policy there. This can be an administrative challenge and may raise serviceability issues, since it might lead to errors and possibly even data leaks.

Again, application of a host policy in the network fabric is always switch-specific. Thus, for any adequate end-to-end host admission policing, the administrator may undesirably have to plan out the relevant sender and corresponding receiver policies and apply these policies throughout the network fabric.

Figure 1B:
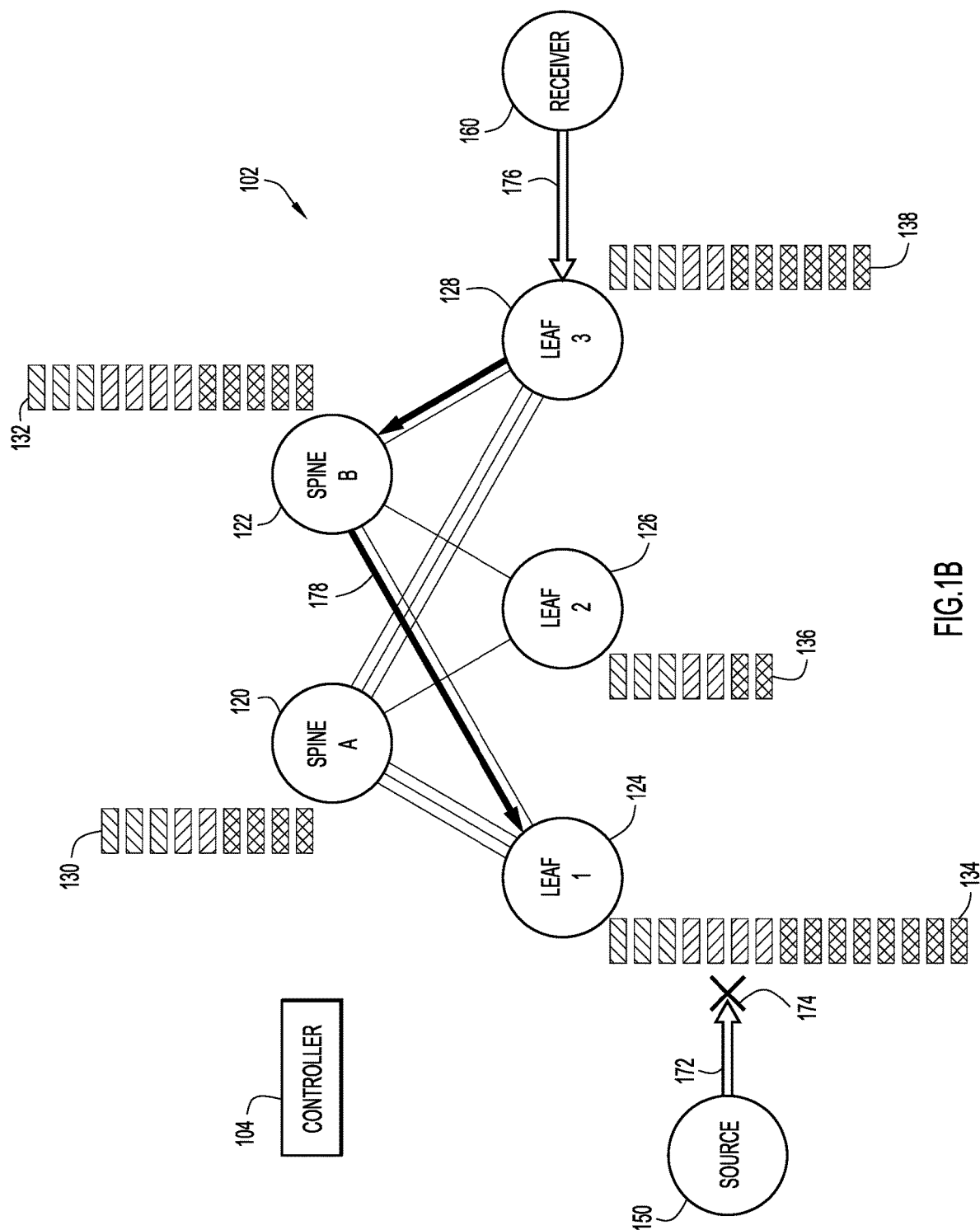

With reference now to FIG. 1B, consider the network fabric 102 where a particular sender or source 150 has a request 172 that is denied at 174. In response, one may apply a sender deny policy on a First Hop Router (FHR) (e.g. at leaf node switch 124). However, if a Join request 176 (e.g. a "V3 IGMP Join") from a receiver 160 is received on a switch (e.g. leaf node switch 128) in the network fabric 102, a flow provisioning 178 of the flow will still nonetheless be stitched all the way to the FHR (i.e. to leaf node switch 124). While actual traffic will not flow, this "spurious" flow provisioning 178 itself uses up precious resources. As is apparent, such spurious flows inflict a cost to the fabric and prevent legitimate flows from being provisioned. See e.g. FIG. 1C, where a subsequent request 192 from a receiver 194 for a flow from a permitted sender or source 190 may be blocked at 196 due to the spurious flow provisioning 178. The only current solution to prevent this is that, for each sender deny policy, one should go and apply a corresponding receiver deny policy everywhere.

The issue comes into play when an administrator detects an unwelcome flow in the network fabric. This is apparent when there is a detection of an unwelcome sender or receiver in the network fabric. To remove such a flow from the system, one needs to identify specific interfaces where the offending endpoints are connected and go apply deny policies there. Note again that just denying the sender will not be enough; one needs to deny receivers as well to free up system resources. Similarly, to allow a previously-denied stream, one needs to go the interface where the source will be connected (as well as each interface where a receiver is expected) and apply a permit policy there. Such procedure handling is not elegant and may raise serviceability issues, since it might lead to errors and possibly even data leaks.

Thus, in a network fabric configured to provide "guaranteed" bandwidths for IP multicast traffic flows, host policy management becomes increasingly important as spurious flows that are provisioned with bandwidth may undesirably block subsequent host requests. This is especially the case using an IP network data router configured for the delivery of data, such as media data, a product suitable to replace serial digital interface (SDI) technology utilizing cross-bar switches.

Figure 2:
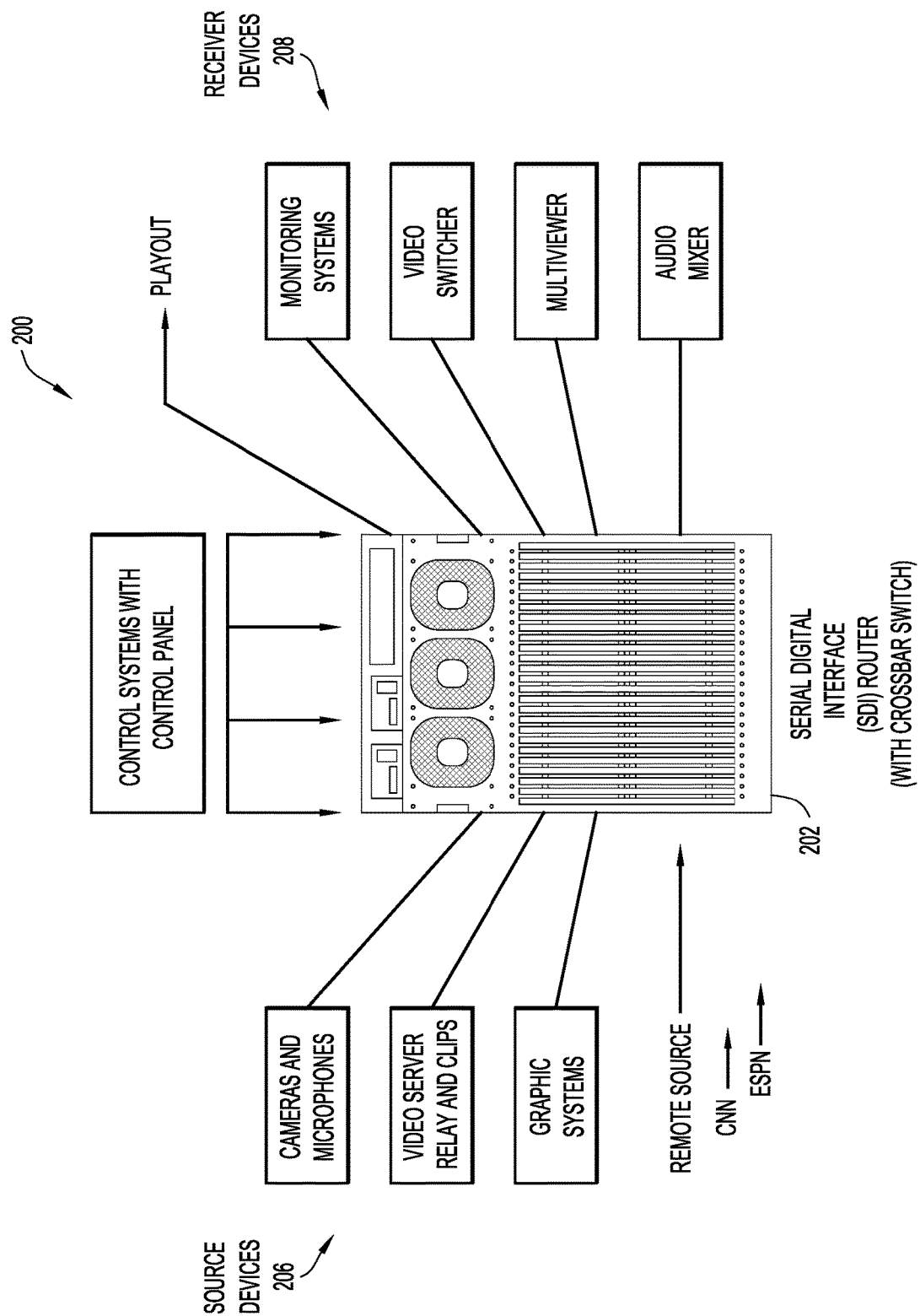
FIG. 2 is an illustration of a system for delivering media data with use of a serial digital interface (SDI) router having a crossbar switch, which relates to a prior product implementation.

To better illustrate in FIG. 2, a system 200 for delivery of media data with use of an SDI router 202 is shown. System 200 with SDI router 202 may be used for the communication of media signals, such as video signals. As shown, a plurality of source devices 206 may connect to SDI router 202 to send media signals. Source devices 206 may include cameras and microphones, video server relay and clips, graphic systems, remote sources, television broadcast sources (e.g. CNN, ESPN television signal sources), and/or any other suitable source devices. A plurality of receiver devices 208 may connect to SDI router 202 to receive media signals from any one of the sources devices 206. As illustrated, receiver devices 208 may include monitoring systems, video switches, multi-viewers, audio mixers, and/or any other suitable receiver devices. As stated above, the SDI router 202 includes a crossbar switch having multiple input and output lines that form a crossed pattern of interconnecting lines between which a connection may be established. An input line may be "tapped" to send media signals from one of source devices 206 so that the media signals may be received by multiple receiver devices 208 on multiple output lines. Note that the crossbar switch is not easily scalable or expandable, and the input and output lines of the crossbar switch have fixed bandwidths.

Figure 3:
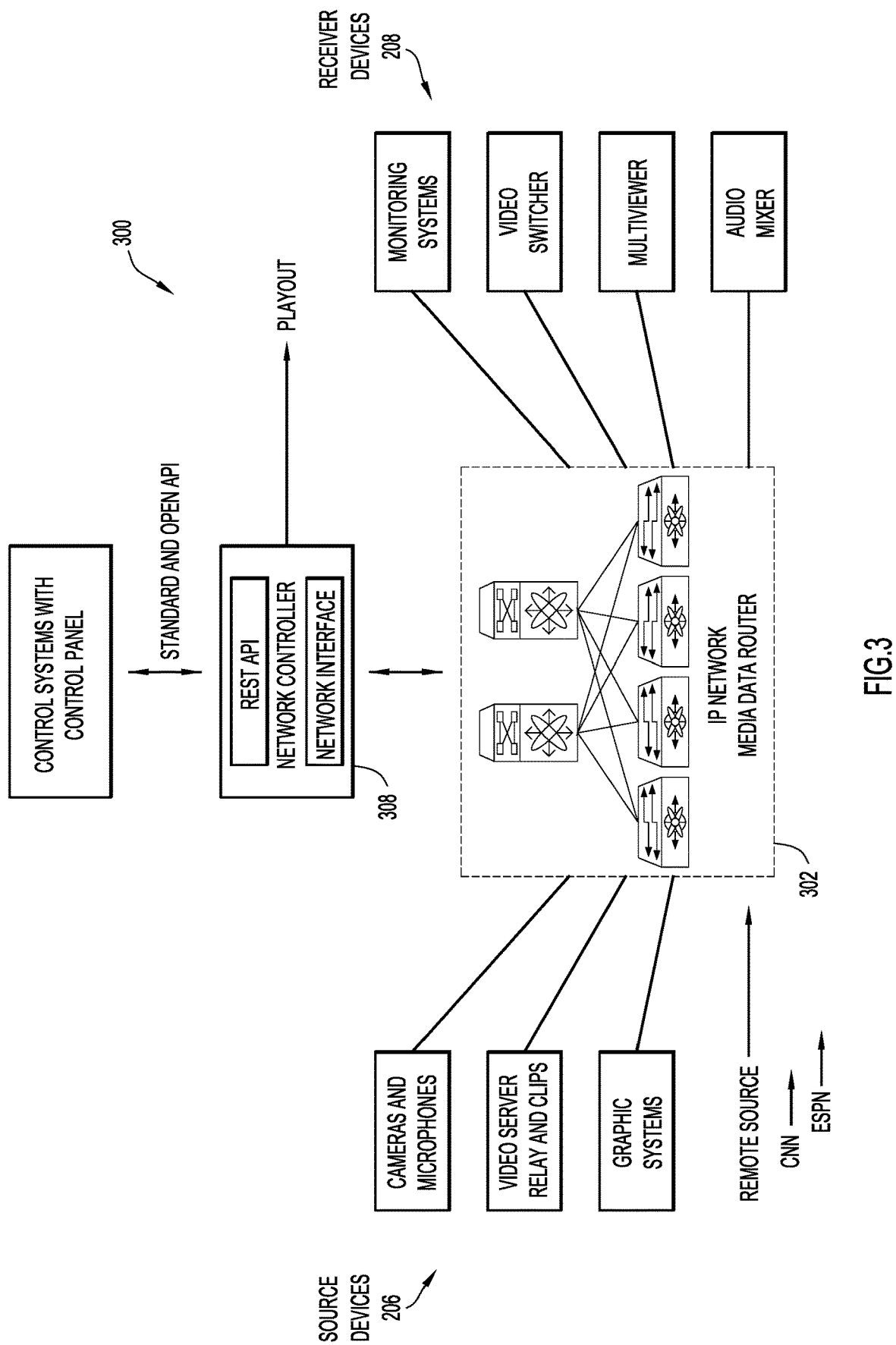
FIG. 3 is an illustrative representation of a system for use in delivering IP multicast media data with use of an IP network media data router, which is an example product within which at least some implementations of the present disclosure may be realized.

FIG. 3 is an illustration of a system 300 for use in delivering an IP multicast of media data with use of an IP network media data router 302. IP network media data router 302 may be operative to provide IP multicast delivery of media data from source devices 206 to receiver devices 208. In particular, the IP network media data router 302 may be configured to provide a guaranteed non-blocking IP multicast delivery of media data, such as for video for live studio broadcast production. Note that the system 300 of FIG. 3 may be referred to as an IP Fabric for Media solution.

The source devices 206 may connect to IP network media data router 302 to send media data (e.g. video data) via IP multicast delivery, and the receiver devices 208 may connect to IP network media data router 302 to receive the media data via the IP multicast delivery from any one of the sources devices 206. As shown in FIG. 3, a network controller 308 may be provided to connect to IP network media data router 302 via a network interface, for control by one or more control systems via an application programming interface (API) (e.g. a REST API).

Figure 4A:
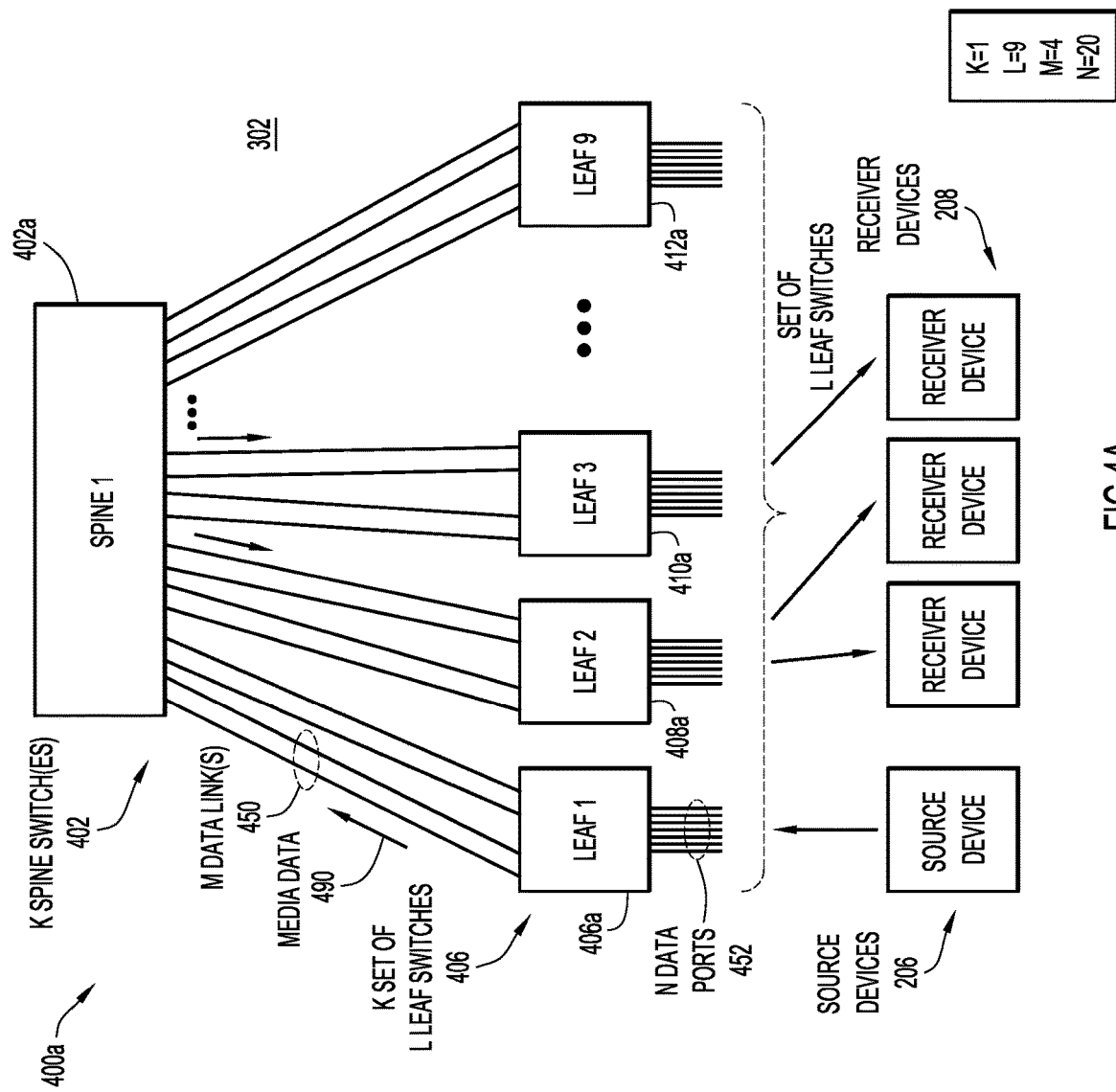
FIG. 4A is an illustration of an example of a spine and leaf switch architecture of the IP network media data router of FIG. 3, which may provide a guaranteed non-blocking IP multicast delivery of media data, and which is an example architecture within which at least some implementations of the present disclosure may be realized.

FIG. 4A is an illustration of one example of a spine and leaf switch architecture 400a which may be used in the IP network media data router 302 of FIG. 3. Spine and leaf switch architecture 400a of IP network media data router 302 of FIG. 4A is operative to provide IP multicast delivery of media data from source devices 206 to receiver devices 208. To provide IP multicast delivery, spine and leaf switch architecture 400a may operate with use of one or more multicast protocols, such as Internet Group Management Protocol (IGMP), Protocol Independent Multicast (PIM), and/or other suitable protocols.

Although a spine and leaf architecture is shown and described in the present disclosure, it is noted that such topology is used to provide merely an illustrative example topology within which techniques of the present disclosure may be utilized. Thus, implementations of the present disclosure may be applied to a network fabric having a plurality of network nodes connected in any suitable topology configuration, such as a single box topology, a mesh topology, a ring topology, etc.

As illustrated in FIG. 4A, spine and leaf switch architecture 400a may include K spine switches 402 (e.g. spine switch 402a), K sets of L leaf switches 406 (e.g. leaf switches 406a, 408a, 410a, through 412a for a total of 9 leaf switches), M data links 450 between each leaf switch and each spine switch, and a plurality of bidirectional data ports 452 (i.e. for source and receiver connections) connected to each leaf switch. Each one of data links 450 may be provided or set with a maximum link bandwidth of $BW_L$. Source devices 206 and receiver devices 208 may connect to any of the bidirectional data ports 452 for the communication of media data. Note that, although data ports 452 are bidirectional, their use in practice is highly asymmetrical (i.e. one-way, depending on whether the connected device is a source or a receiver). Also note that in actual practice, the number of receiver devices 108 connected to bidirectional data ports 452 may far exceed the number of source devices 206 connected to bidirectional data ports 452.

To illustrate the basic approach in FIG. 4A, one of source devices 106 may send media data through one of bidirectional data ports 452 of leaf switch 406(a). An IP multicast of the media data (e.g. media data 490) may be sent from leaf switch 406(a) up to spine switch 402a, and then down to leaf switches 408a and 410a. Two of the receiver devices 208 may receive the media data via leaf switch 408a as shown, and another one of the receiver devices 208 may receive the media data via leaf switch 410a as shown.

In some implementations, the IP network media data router 302 may be provided and/or specified with a maximum number of the bidirectional data ports 452

$$N=(a/K)\times(BW_L/BW_P)$$

for a non-blocking IP multicast delivery of data at a maximum port bandwidth of $BW_P$, where a is a fixed constant greater than or equal to K. More specifically, the non-blocking of IP multicast delivery may be a guaranteed non-blocking IP multicast delivery. In some implementations, the IP network media data router 302 may have exactly N bidirectional data ports connected to each leaf switch as specified above. More generally, the number of bidirectional data ports provided for use in the IP network media data router 302 may be $N \leq (a/K)\times(BW_L/BW_P)$ for guaranteed non-blocking IP multicast delivery.

Note that when the property or constraint of $N \leq (a/K)\times(BW_L/BW_P)$ is satisfied (i.e. the non-blocking feature is in effect), any or most any traffic flow pattern using source and receiver devices 206 and 208 connected to bidirectional data ports 452 may be achieved. When the property or constraint is violated (i.e. $N > (a/K)\times(BW_L/BW_P)$), the non-blocking aspect may not hold and is not guaranteed. Connectivity between source and receiver devices 206 and 208 may degrade gradually. Some of receiver devices 208 may not be able to receive their traffic flows, and this depends on the input traffic matrix, the position of the source and receiver devices in the network topology. Reviewing the mathematical expressions and relationships, IP network media data router 302 may be configured with the property of $M \times BW_L \geq N \times BW_P$. "M" may be a function of K, where $M=(a/K)$. Here, "a" is a special case of M where K=1. The fixed value of "a" may be any suitable number greater than K, such as any number greater than two (2), or more specifically $2 \leq K \leq 10$.

In FIG. 4A, it is shown that spine and leaf switch architecture 400a is configured such that K=1, L=9, M=4, and N=40. In addition, $a=K \times M=4$. The bandwidth of a data link may be expressed in speed or bits per second (bps), such as Gigabits per second (Gbps). In this example, the maximum link bandwidth $BW_L$ of a data link may be provided or set to be 100 Gbps, the maximum port bandwidth $BW_P$ of a bidirectional data port may be provided or set to be 10 Gbps, and IP network media data router 302 of FIG. 4A may be provided or specified with a maximum of forty (40) bidirectional data ports 452 that may be used for (guaranteed) non-blocking IP multicast delivery of data at a maximum port bandwidth of $BW_P$.

Figure 4B:
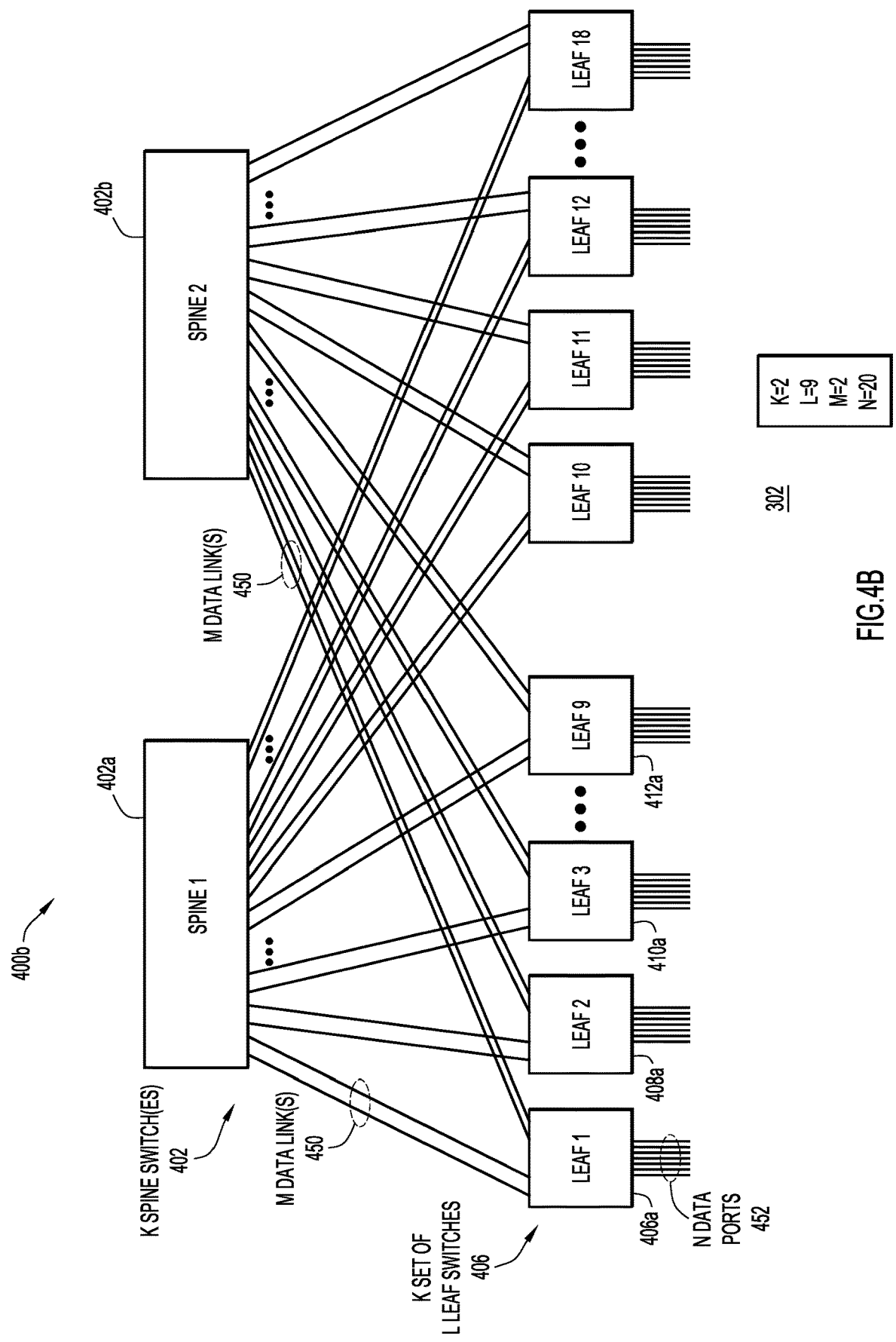
FIG. 4B is an illustration of another example of a spine and leaf switch architecture of the IP network media data router of FIG. 3, which may provide a guaranteed non-blocking IP multicast delivery of media data, and which is an example architecture within which at least some implementations of the present disclosure may be realized.

In some implementations, the spine and leaf switch architecture 400a may be reconfigurable and/or expandable to include C additional spine switches and C additional sets of L leaf switches (e.g. of the same or similar manufacture), e.g. for natural numbers of $(K \times M)/(K+C)$. To illustrate, FIG. 4B is an illustration of another example of a spine and leaf switch architecture 400b of IP network media data router 302. The spine and leaf switch architecture 400b of FIG. 4B may be substantially the same as or similar to the design of spine and leaf switch architecture 400a of FIG. 4A, except that the architecture has been reconfigured and/or expanded to include C additional spine switches (where C=1, for a total number of 2 spine switches) and C additional sets of L leaf switches (where C=1, for a total number of 2 sets of 9 leaf switches=18 leaf switches) as just previously described. Here, the maximum link bandwidth $BW_L$ of a data link may be maintained to be 100 Gbps, the maximum port bandwidth $BW_P$ of a bidirectional data port may be maintained to be 10 Gbps, and IP network media data router 302 of FIG. 4B may now be provided or specified with a new maximum number of twenty (20) bidirectional data ports 452 for (guaranteed) non-blocking IP multicast delivery of data at a maximum port bandwidth of $BW_P$.

The IP network media data router 302 of FIGS. 3, 4A, and/or 4B may operate according to the example operational description now provided in relation to FIGS. 5A-5B and 6A-6B. Reference will be made back to the spine and leaf switch architecture 400b of FIG. 4B, where $K \geq 2$. In general, the spine and leaf switch architecture 400b of FIG. 4B may operate such that only a single spine switch (e.g. spine switch 402a) is activated for use and used for IP multicast delivery of media data, so long as bandwidth on the data links to the spine switch is available (i.e. bandwidth limit not yet reached; some bandwidth is unused). When bandwidth on the data links to the selected spine switch becomes unavailable (i.e. bandwidth limit reached; all bandwidth used), then a next one of the spine switches (e.g. spine switch 402b) may be activated and used for the IP multicast delivery of media data for new requests. Such operation may be continued and/or repeated for additional spine switches.

Here, data links between spine and leaf switches may be selected for IP multicast delivery of media data with use of link selection modules. In general, the link selection modules may select data lines in a round robin fashion. The link selection modules may be token-based link selection modules for selecting data links while tracking the available/unavailable or used/unused bandwidths on the data links (see e.g. FIGS. 5A-5B and 6A-6B), preferably without use of any hashing-based link selection algorithms. Thus, data links with a given spine switch may be selected in accordance with 5A-5B and 6A-6B until the bandwidth limit for the data links is reached, in which case a new spine switch is activated and used (i.e. a copy of the data may be made to the newly-selected spine switch).

Note that if no new spine switch is available, the bandwidth limit for the router has been reached and new host requests may be blocked. Relatedly, when spurious traffic flows are provisioned, this still results in the reservation of bandwidth. Accordingly, it is one object of the present disclosure to reduce the number of spurious traffic flows that are provisioned with use of improved techniques for host policy management, so that the "guaranteed" nature of the guaranteed non-blocking aspect of the router may be more fully realized or met.

Figure 5B:
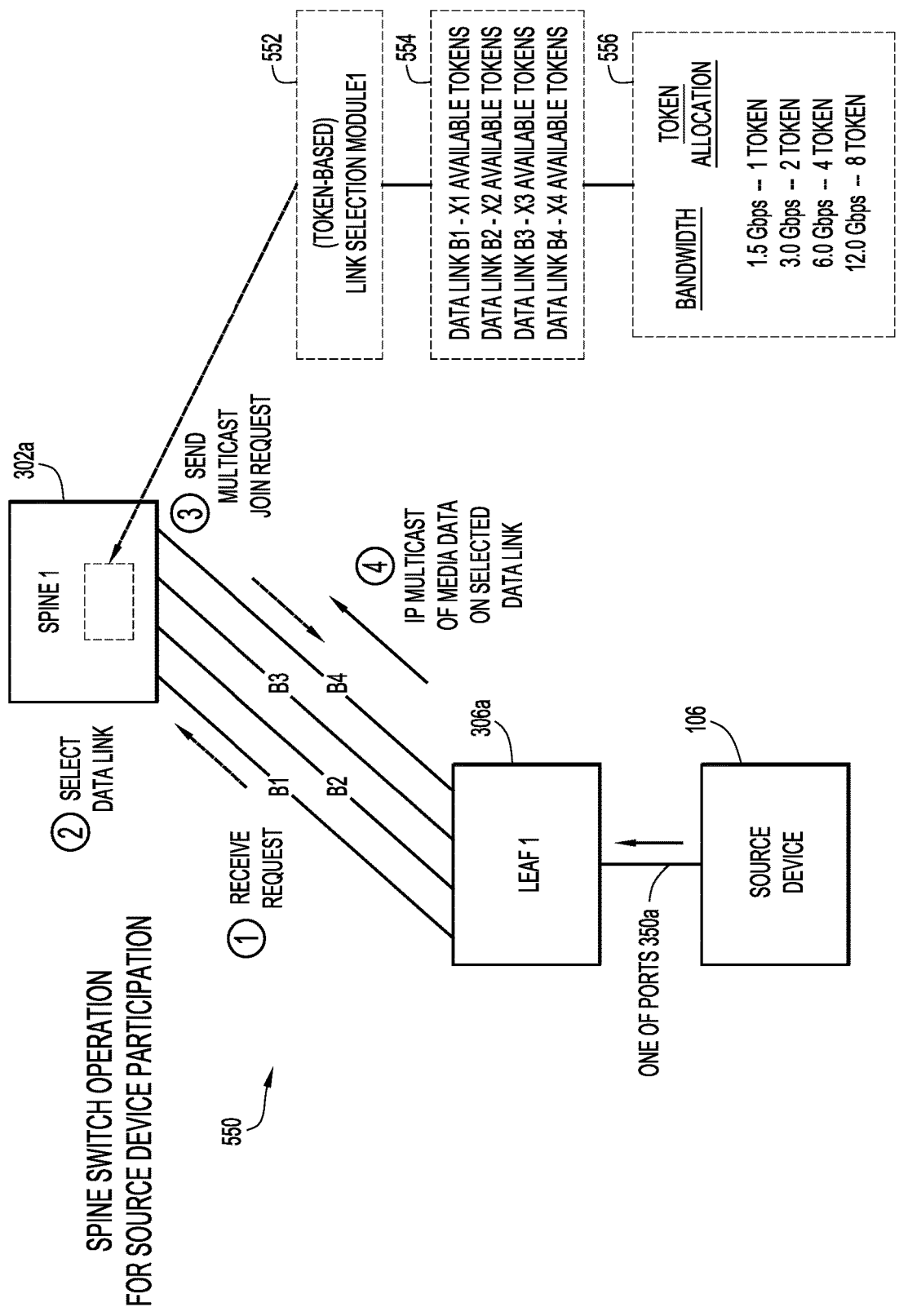
FIG. 5B is a flow diagram for describing the method of operation of a spine switch for source device participation corresponding to the flowchart of FIG. 5A.

FIG. 5A is a flowchart 500 for describing a method of operation of a spine switch for source device participation, for use in providing a non-blocking IP multicast delivery of media data in an IP network media data router according to some implementations of the present disclosure. Relatedly, FIG. 5B is a flow diagram 550 for describing the method of operation of the spine switch for source device participation corresponding to the flowchart 500 of FIG. 5A. The method of the flowchart 500 of FIG. 5A will be described in combination with flow diagram 550 of FIG. 5B. Beginning at a start block 502 of FIG. 5A, a spine switch of the router may receive a request message from a source device via a leaf switch (step 504 of FIG. 5A). See reference point (1) in FIG. 5B. The request message may be or include PIM register message for registration of the source device. In response, the spine switch will have to select one of the data links with the leaf switch over which the media data/stream will take place. See reference point (2) in FIG. 5B.

The selection of the data link may be performed with use of a link selection module. Referring to FIG. 5B, a link selection module 552 for use in selecting a data link for the IP multicast delivery of media data is shown. In general, link selection module 552 may select from data links in a round robin fashion. In some implementations, link selection module 552 may further be a token-based link selection module, where bandwidth of the data links is managed, tracked, and/or monitored with use of a stored association 554 between data links and available tokens. Here, data link selection may be performed without use of a hash-based algorithm. In token-based data link selection, each token may represent a fixed amount of bandwidth. A number of available tokens associated with a given data link may represent the current amount of bandwidth available on the data link. In FIG. 5B, the stored association 554 is shown between data link B1 and X1 available tokens, data link B2 and X2 available tokens, data link B3 and X3 available tokens, and data link B4 and X4 available tokens. An example of a token allocation table 556 is also illustrated in FIG. 5B, showing that a single token represents 1.5 Gbps bandwidth. Here, 1 token may be allocated for 1.5 Gbps bandwidth, 2 tokens may be allocated for 3.0 Gbps bandwidth, 4 tokens may be allocated for 6.0 Gbps bandwidth, 8 tokens may be allocated for 12 Gbps bandwidth, etc. Thus, a token allocation procedure is performed to track the available/unavailable or used/unused bandwidth of the data links. Note that tokens may be deallocated as well when sources and/or receivers withdraw.

Referring back to FIG. 5A, a candidate data link with the leaf switch is selected for consideration (step 506 of FIG. 5A). In general, the selection of candidate data links may be performed in a round robin fashion. It is determined whether the number of tokens available for the candidate data link is greater than or equal to the number of tokens requested or needed for delivery of the media data (step 508 of FIG. 5A). If "no" at step 508 (i.e. there is insufficient bandwidth on the candidate data link), then it may be determined whether there are any additional candidate data links with the leaf switch to consider (step 516 of FIG. 5A). If "yes" at step 516, then a next candidate data link with the leaf switch is selected for consideration at step 506. If "no" at step 516, then a bandwidth limit on the data links with the spine switch has been reached (step 518 of FIG. 5A). If the number of tokens available for the candidate data link is greater than or equal to the number of tokens requested or needed for delivery of the media data in step 508 (i.e. there is sufficient bandwidth on the candidate data link), then the candidate data link is selected for the IP multicast delivery of the media data. Here, the number of tokens requested or needed for the delivery of the media data is allocated to the communication from the number of tokens available for the data link (step 510 of FIG. 5A). A request to join may be sent to the leaf switch on the selected data link (step 512 of FIG. 5A). The request to join may be a PIM multicast join. See reference point (3) in FIG. 5B. Subsequently, an IP multicast of media data from the source device is received on the selected data link via the leaf switch (step 514 of FIG. 5A). See reference point (4) in FIG. 5B.

Figure 6A:
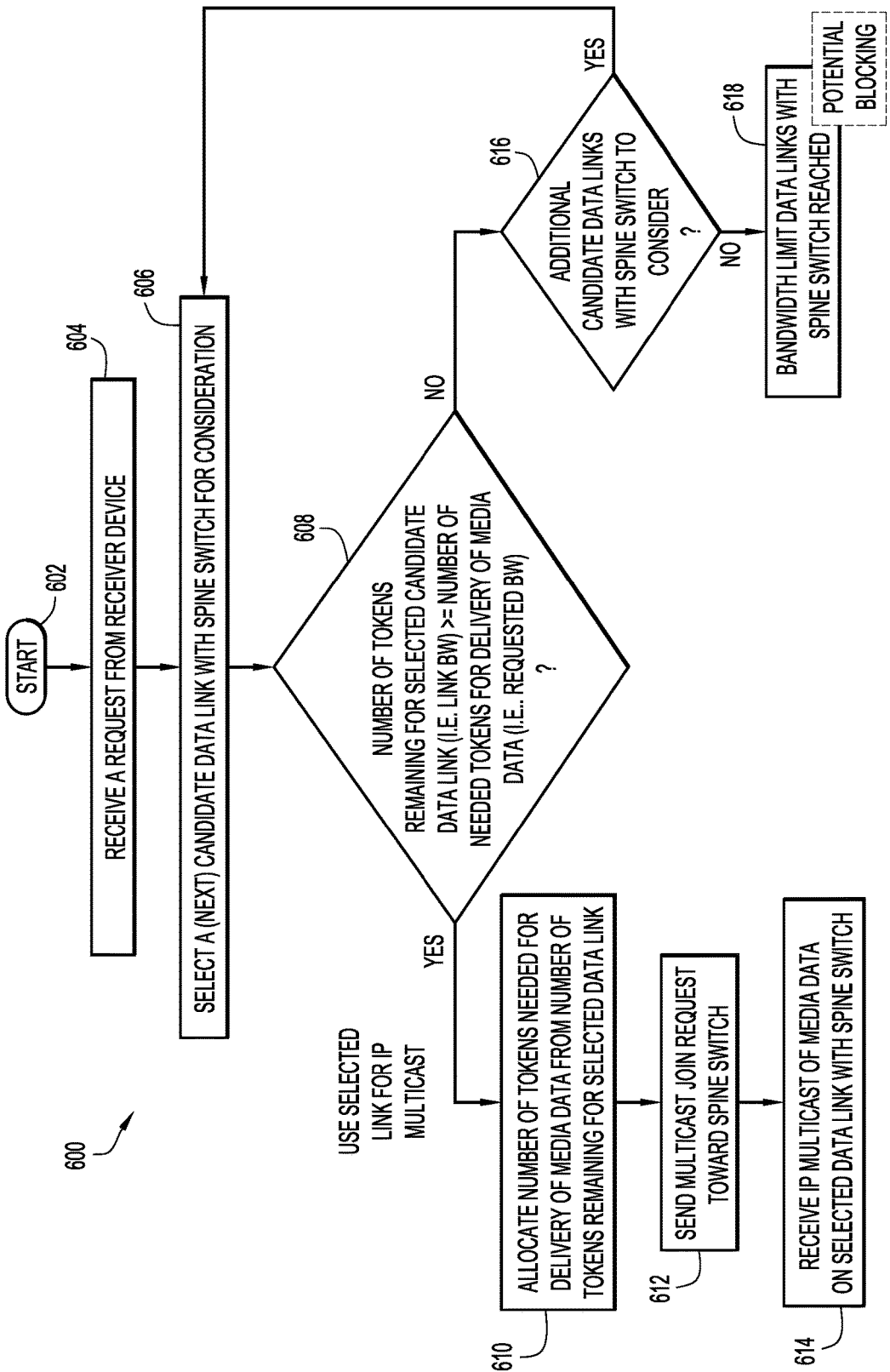
FIG. 6A is a flowchart for describing a method of operation of a leaf switch for receiver device joining in the IP network media data router of FIG. 3, for use in providing a guaranteed non-blocking IP multicast delivery of media data.
Figure 6B:
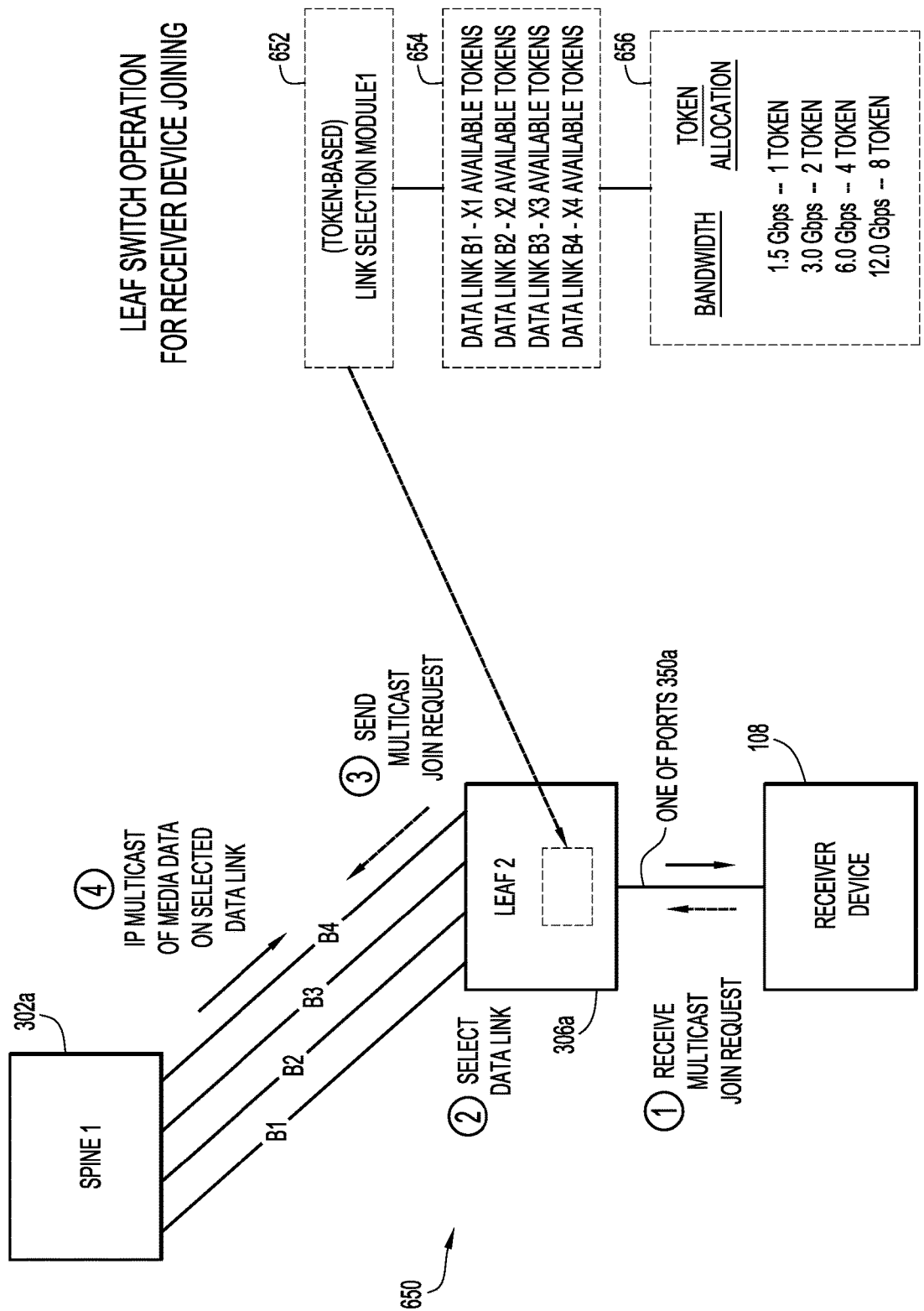
FIG. 6B is a flow diagram for describing a method of operation of a leaf switch for receiver device joining corresponding to the flowchart of FIG. 6A.

FIG. 6A is a flowchart 600 for describing a method of operation of a leaf switch for receiver device joining, for use in providing a non-blocking IP multicast delivery of media data according to some implementations of the present disclosure. Relatedly, FIG. 6B is a flowchart 650 for describing a method of operation of the leaf switch for receiver device joining corresponding to the flowchart 600 of FIG. 6A. The method of the flowchart 600 of FIG. 6A will be described in combination with flow diagram 650 of FIG. 6B. Beginning at a start block 602 of FIG. 6A, a leaf switch of the router may receive a request message from a receiver device via a bidirectional data port (step 604 of FIG. 6A). The request message may be or include a request to join a multicast group, for example, a PIM multicast join. See reference point (1) in FIG. 6B. In response, the leaf switch will have to select one of the data links with a (currently active) spine switch over which the IP multicast delivery of the media data will take place. See reference point (2) in FIG. 6B.

The selection of the data link may be performed in the leaf switch with use of a link selection module. Operation is similar to that described in the spine switch in relation to FIGS. 5A-5B above, but provided here for completeness. Referring to FIG. 6B, a link selection module 652 for use in selecting a data link for the IP multicast delivery of the media data is shown. In general, link selection module 652 may select from data links in a round robin fashion. In some implementations, link selection module 652 may be a token-based link selection module, where bandwidth of the data links is managed, tracked, and/or monitored with use of a stored association 654 between data links and available tokens. Here, data link selection may be performed without use of a hash-based algorithm. In the token-based data link selection, each token may represent a fixed amount of bandwidth. A number of available tokens associated with a given data link may represent the current amount of bandwidth available on the data link. In FIG. 6B, the stored association 654 is shown between data link B1 and X1 available tokens, data link B2 and X2 available tokens, data link B3 and X3 available tokens, and data link B4 and X4 available tokens. An example of a token allocation table 656 is also illustrated in FIG. 6B, showing that a single token represents 1.5 Gbps bandwidth. Here, 1 token may be allocated for 1.5 Gbps bandwidth, 2 tokens may be allocated for 3.0 Gbps bandwidth, 4 tokens may be allocated for 6.0 Gbps bandwidth, 8 tokens may be allocated for 12 Gbps bandwidth, etc. Thus, a token allocation procedure may be performed for tracking the bandwidth of the data links. Note that tokens may be deallocated as well when sources and/or receivers withdraw.

Referring back to FIG. 6A, a candidate data link with the leaf switch is selected for consideration (step 606 of FIG. 6A). In general, the selection of candidate data links may be performed in a round robin fashion. It is determined whether the number of tokens available for the candidate data link is greater than or equal to the number of tokens requested or needed for delivery of the media data (step 608 of FIG. 6A). If "no" at step 608 (i.e. there is insufficient bandwidth on the candidate data link), then it may be determined whether there are any additional candidate data links with the spine switch to consider (step 616 of FIG. 6A). If "yes" at step 616, then a next candidate data link with the spine switch is selected for consideration at step 606. If "no" at step 616, then a bandwidth limit on the data links with the spine switch has been reached (step 618 of FIG. 5A). If the number of tokens available for the candidate data link is greater than or equal to the number of tokens requested or needed for delivery of the media data in step 608 (i.e. there is sufficient bandwidth on the candidate data link), then the candidate data link is selected for the IP multicast delivery of the media data. Here, the number of tokens requested or needed for the delivery of the media data is allocated to the communication from the number of tokens available for the data link (step 610 of FIG. 6A). A request to join may be sent to the spine switch on the selected data link (step 612 of FIG. 6A). The request to join may be a PIM multicast join. See reference point (3) in FIG. 6B. Subsequently, an IP multicast of media data from a source device is received on the selected data link via the spine switch (step 614 of FIG. 6A). See reference point (4) in FIG. 6B.

As described, data links with a given spine switch may be selected in accordance with FIGS. 5A-5B and 6A-6B until the bandwidth limit for the data links is reached. Here, a new spine switch may be activated and used (i.e. a copy of incoming data traffic may be made to the newly-selected spine switch). Again, if no new spine switch is available, the bandwidth limit for the router has been reached and new requests may be blocked. Relatedly, when spurious traffic flows are provisioned, this still results in the reservation of bandwidth.

Accordingly, it is one object of the present disclosure to reduce the number of spurious traffic flows that are provisioned with use of improved techniques for host policy management, so that the "guaranteed" nature of the guaranteed non-blocking aspect of the router may be more fully realized or met. Other objects of the present disclosure relate to implementations that do not provide the above-described bandwidth guarantees, as the techniques may be applied to a wide variety of implementations. And again, although spine and leaf architectures are shown and described herein, it is noted that such topology is used to provide merely an illustrative example topology within which techniques of the present disclosure may be utilized; any suitable topology configuration, such as a single box topology, a mesh topology, a ring topology, etc., may be utilized.

According to at least some implementations of the present disclosure, a distributed approach to host admission policy management may be provided. A system administrator may generate a global or system-wide host policy definition set, without the need of a per-switch or a per-interface categorization. The set of all host policies may be configured on all the switches in the network fabric, for example, through a controller or command line interface (CLI).

When the global set of host policies is received by the switches, each switch may run a filtering mechanism on the global set to decide which policies are applicable to the local interfaces of the switch. This results in a local subset of host policies applicable to the switch. The applicable subset for each switch may be published and available for the administrator to view. Host policy application may be performed a priori (i.e. before any hosts show up on the switch), to thereby remove any chance of any traffic from rogue endpoints coming in to the system.

Herein, in some implementations, each one of the host policies (e.g. at least many or most) may have an associated host IP address field which may be used by the switches to filter and calculate the applied local policy set. Filtering of the global set of host policies may be performed by comparing a subnet IP address of the interface with the host IP address field associated with the host policy, for each host policy in the global set.

Regular, ongoing changes to the host policies may be regularly applied to all of the switches in the network fabric. In the event of any changes on the network fabric (e.g. changes in network topology, link migration, IP address changes on the existing interface, addition or removal of an interface on a switch), each switch may refactor the global set and update the applied policy set on the switch. Addition of a new switch in the topology may prompt the administrator or cause the controller to push the global set of host policies to the new node, where its filtering mechanism helps to decide the relevant host policies to apply to the new node.

In the IP Fabric for Media solution, guaranteed bandwidth management is one key to efficiently provisioning flows in a network fabric. With prior techniques, in a scenario where a receiver sends a Join request (e.g. an IGMP V3 (S, G) join) and wants to receive traffic from a previously-denied sender, a permitted receiver will still undesirably get provisioned all the way to FHR, thereby unnecessarily consuming bandwidth (at least temporarily). With techniques of the present disclosure, such unnecessary reservation of bandwidth for the denied sender may be avoided. As the receiver switch includes the global set of sender host policies, in response to detecting a Join request, the receiver switch may consult the locally-applicable receiver host admission policy subset as well as the global sender host admission policy subset before allowing any receivers. If the sender is denied, the switch may not accept the receiver in the system. Such a proactive checking of sender policies on the receiver switch helps in the efficient management of bandwidth in the network fabric.

As the host policies are implemented in the software, there is no hardware limitation on the number of policies that can be applicable on a switch. Any changes made to the host policies may be received in software and immediately acted upon. If a previously-permitted host is subsequently denied, the software can immediately delete the flow everywhere in the network fabric. Similarly, if a previously-denied host is subsequently permitted, the flow can immediately be established without waiting for any retries from the hosts.

Using a software solution in contrast to a hardware solution may also facilitate a more granular and detailed statistic collection for network management. For instance, the applied set of host policies may be exported from each switch, where the controller can view of the applied subset of host policies per node. In addition, switches may also export the hit count per host policy from each node in the fabric. This provides a visibility to the administrator not only in terms of which host policies are applied on a given node but also which of them are currently getting consulted.

Some further advantageous include the ease of deployment, since the administrator does not need to know on which switch or interface the hosts are attached. The administrator may push the same exact same policies to all the nodes in the network fabric. Host policies may be applied to an interface at runtime by each switch independently and therefore, these policies are adaptive to network topology changes. Misconfiguration detection is easy as all the switches have the exact same configuration. Sender host policies may be consulted along with receiver host policies when permitting a host to request to join a flow. In some implementations, the administrator may be made aware of which host policies are being used at what node and how many times each host policy has been hit.

Figure 7:
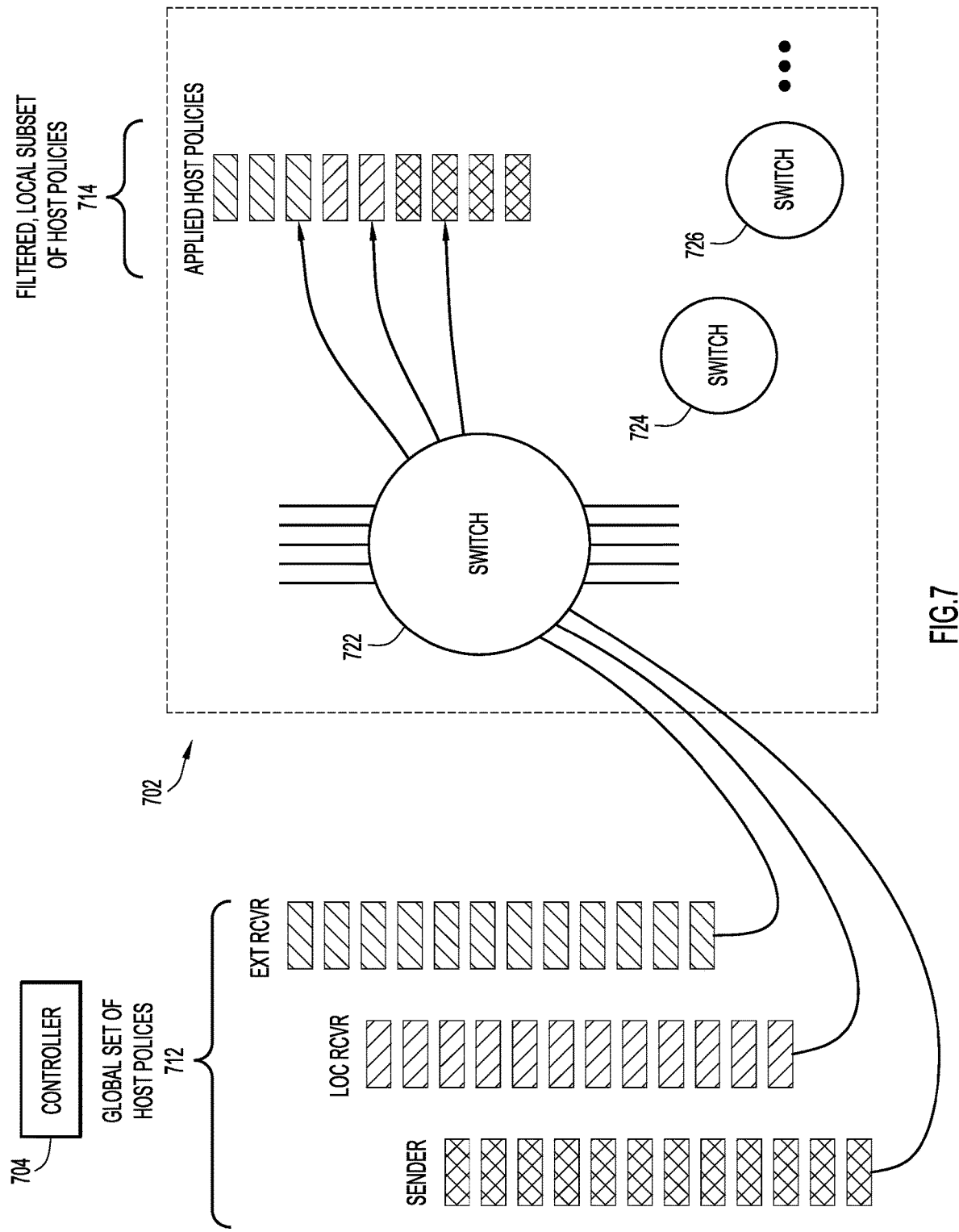
FIG. 7 is an illustrative representation of a system which includes a controller and a network fabric comprised of a plurality of interconnected switches, shown in simplified form for illustrative clarity, where the controller may send to each switch a global set of host policies that are filtered by each switch to obtain a local subset of host policies applicable to the switch.

Referring now back to the drawings, FIG. 7 is an illustrative representation of a system which includes a controller 704 and a network fabric 702 comprised of a plurality of interconnected switches 722, 724, and 726, shown in a simplified arrangement for illustrative clarity. The network fabric 702 of interconnected switches 722, 724, and 726 may be configured to facilitate communication of IP multicast traffic amongst host devices (see e.g. FIGS. 3, 4A-4B, 5A-5B, and 6A-6B), using techniques for host policy management according to some implementations of the present disclosure.

In FIG. 7, the controller 704 may operate to generate a global set of host policies 712 for the network fabric 702. In this example, the global set of host policies 712 may include one or more sender host policies, one or more receiver host policies, and one or more external host policies. The controller 704 may operate to push or otherwise send the global set of host policies 712 to each switch 722, 724, and 726 of the network fabric 702. Upon receipt, each switch (e.g. switch 722) may operate to filter the global set of host policies 712 to obtain a local subset of host policies 714 applicable to the switch 722. Each switch 722 may then operate to grant or deny admission of host devices to receive or send IP multicast traffic flows in the network fabric 702 according to the local subset of host policies 714. In some implementations, each switch may operate to retain at least some host sender policies of the global set, and grant or deny admission of host receiver devices to receive IP multicast traffic flows according to the one or more host sender policies of the global set.

Figure 8:
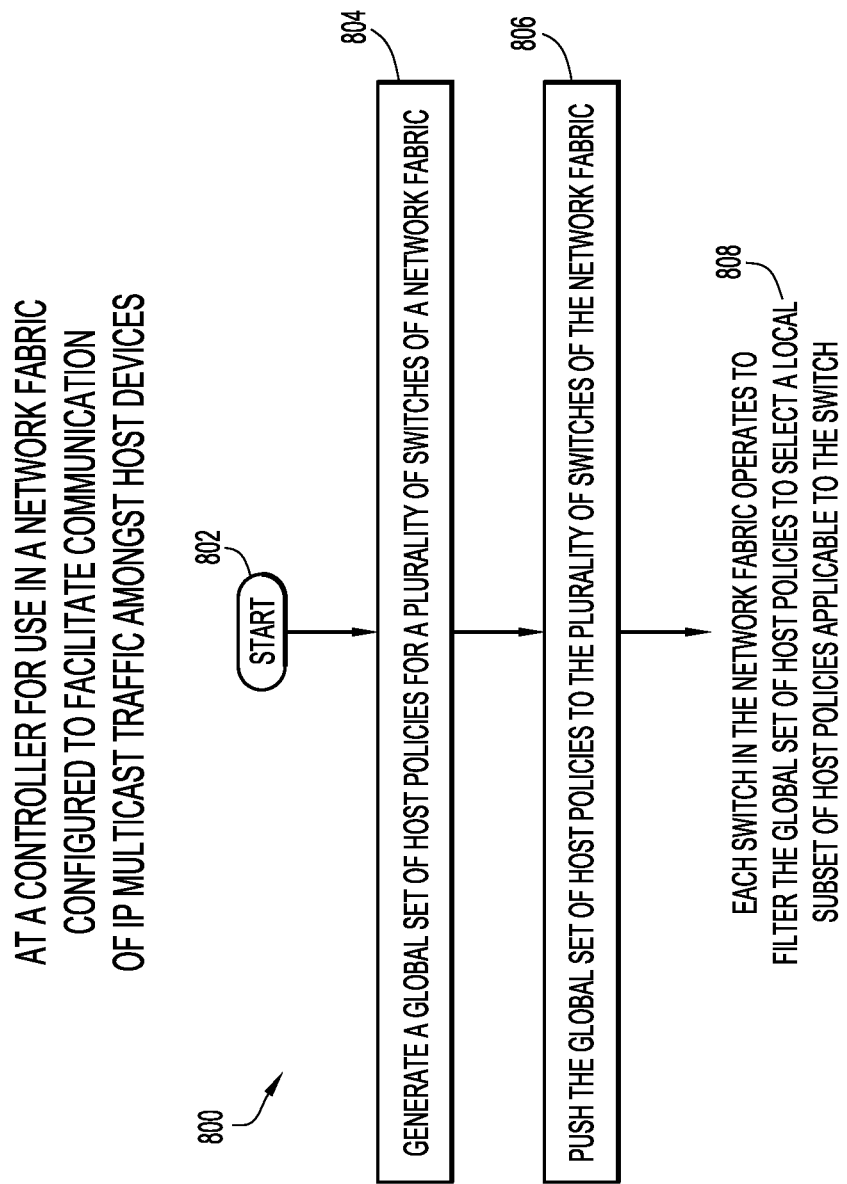
FIG. 8 is a flowchart for describing a method for use in host policy management in a network fabric according to some implementations of the present disclosure, which may be performed by a controller of the network fabric.

FIG. 8 is a flowchart 800 for describing a method for use in host policy management in a network fabric according to some implementations of the present disclosure. The network fabric may include a plurality of interconnected switches configured to facilitate communication of IP multicast traffic amongst host devices (see e.g. FIGS. 3, 4A-4B, 5A-5B, and 6A-6B), using techniques for host policy management according to some implementations of the present disclosure.

The method of FIG. 8 may be performed by a network node, such as a controller for the network fabric which includes the plurality of interconnected switches. The controller may include one or more processors, one or more memories coupled to the one or more processors, and one or more network/communication interfaces or ports. The method may be embodied as a computer program product including a non-transitory computer readable medium and instructions stored in the computer readable medium, where the instructions are executable on one or more processors of the controller for performing the steps of the method.

Beginning at a start block 802 of FIG. 8, a global set of host policies for a plurality of switches of the network fabric may be generated and/or maintained (step 804 of FIG. 8). This global set of host policies may be pushed or otherwise sent to each switch of the plurality of switches (step 806 of FIG. 8). Upon receipt, each switch in the network fabric may operate to filter the global set of host policies to select a local subset of host policies applicable to the switch (step 808 of FIG. 8).

Figure 9:
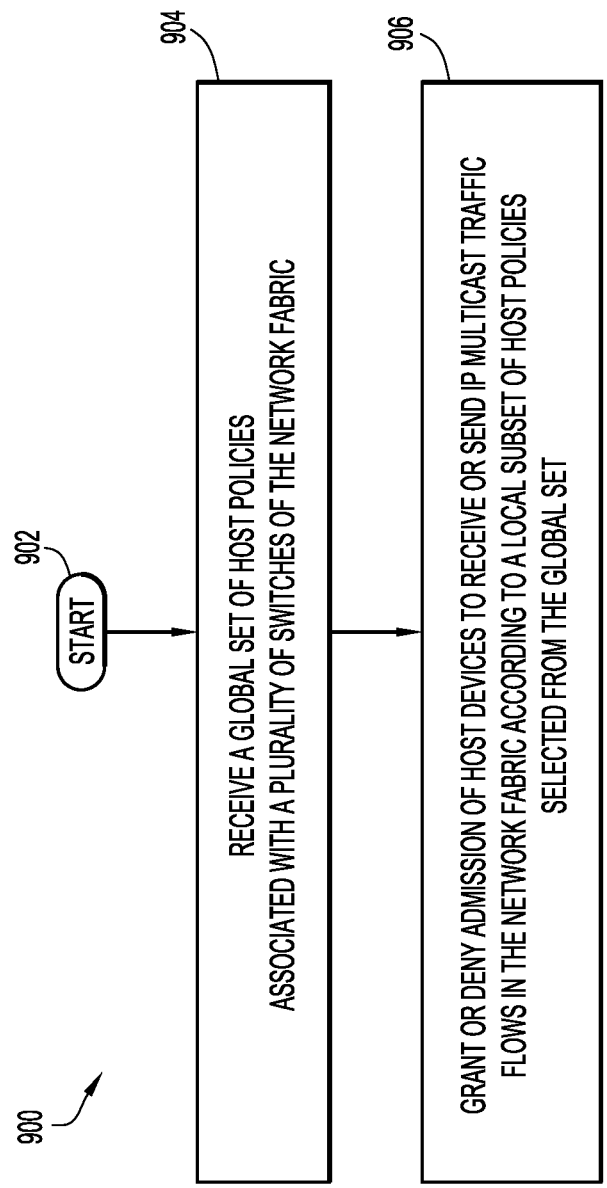
FIG. 9 is a flowchart for describing a method for use in host policy management in a network fabric according to some implementations of the present disclosure, which may be performed by each one of a plurality of interconnected switches of the network fabric.

FIG. 9 is a flowchart for describing a method for use in host policy management in a network fabric according to some implementations of the present disclosure. The network fabric may include a plurality of interconnected switches configured to facilitate communication of IP multicast traffic amongst host devices (see e.g. FIGS. 3, 4A-4B, 5A-5B, and 6A-6B), and use techniques for host policy management according to some implementations of the present disclosure.

The method of FIG. 9 may be performed by a network node, such as by each switch in the network fabric of interconnected switches. Each switch may include one or more processors, one or more memories coupled to the one or more processors, and one or more network/communication interfaces or ports. The method may be embodied as a computer program product including a non-transitory computer readable medium and instructions stored in the computer readable medium, where the instructions are executable on one or more processors of the controller for performing the steps of the method.

Beginning at a start block 902 of FIG. 9, a global set of host policies associated with a plurality of switches of the network fabric may be received (step 904 of FIG. 9). The global set of host policies may include a plurality of host receiver policies and a plurality of host sender policies. A local subset of host policies applicable to the switch may be selected from the received, global set of host policies. The switch may operate to grant or deny admission of host devices to receive or send IP multicast traffic flows in the network fabric according to the local subset of host policies selected form the global set (step 906 of FIG. 9).

In some implementations, the switch may operate to retain host sender policies of the global set, for use in granting or denying admission of host receiver devices to receive IP multicast traffic flows according to the one or more host sender policies of the global set. Also in some implementations, the global set of host policies may include at least some host policies that are applicable to all of the switches (e.g. to all of the interfaces thereof; e.g. always grant, or always deny). Such a host policy may be referred to as a "wildcard" host policy, where there is no host IP address associated therewith (e.g. rather, indicated by a "*" or the like). Here, each switch in the network fabric may operate to select and apply wildcard host policies at the switch, for use in granting or denying admission of host devices to receive or send IP multicast traffic flows in the network fabric according to the wildcard host policies.

FIG. 10 is an example of data of a host policy 1000 which may be used in some implementation of the present disclosure. The example of the host policy 1000 in FIG. 10 is provided in JavaScript Object Notation (JSON) format. Host policy 1000 may be or include a host admission policy associated with a permission for admission of a host device in a particular IP traffic flow. Host policy 1002 may include a plurality of attributes 1010 as indicated in the figure. Attributes 1010 may include, amongst other items, a host IP address 1012 corresponding to a host device, a multicast group address 1014 corresponding to a multicast group, a role 1016 which may indicate either "sender" or "receiver," and a permission 1018 which may indicate either "allowed" or "denied." Again, in some implementations as described earlier above, at least some host policies may be applicable to all interfaces of all of the switches of the network fabric (e.g. always grant, or always deny); such a host policy may be referred to as a "wildcard" host policy, where there is no host IP address associated therewith (e.g. rather, indicated by a "*" or the like).

Figure 11:
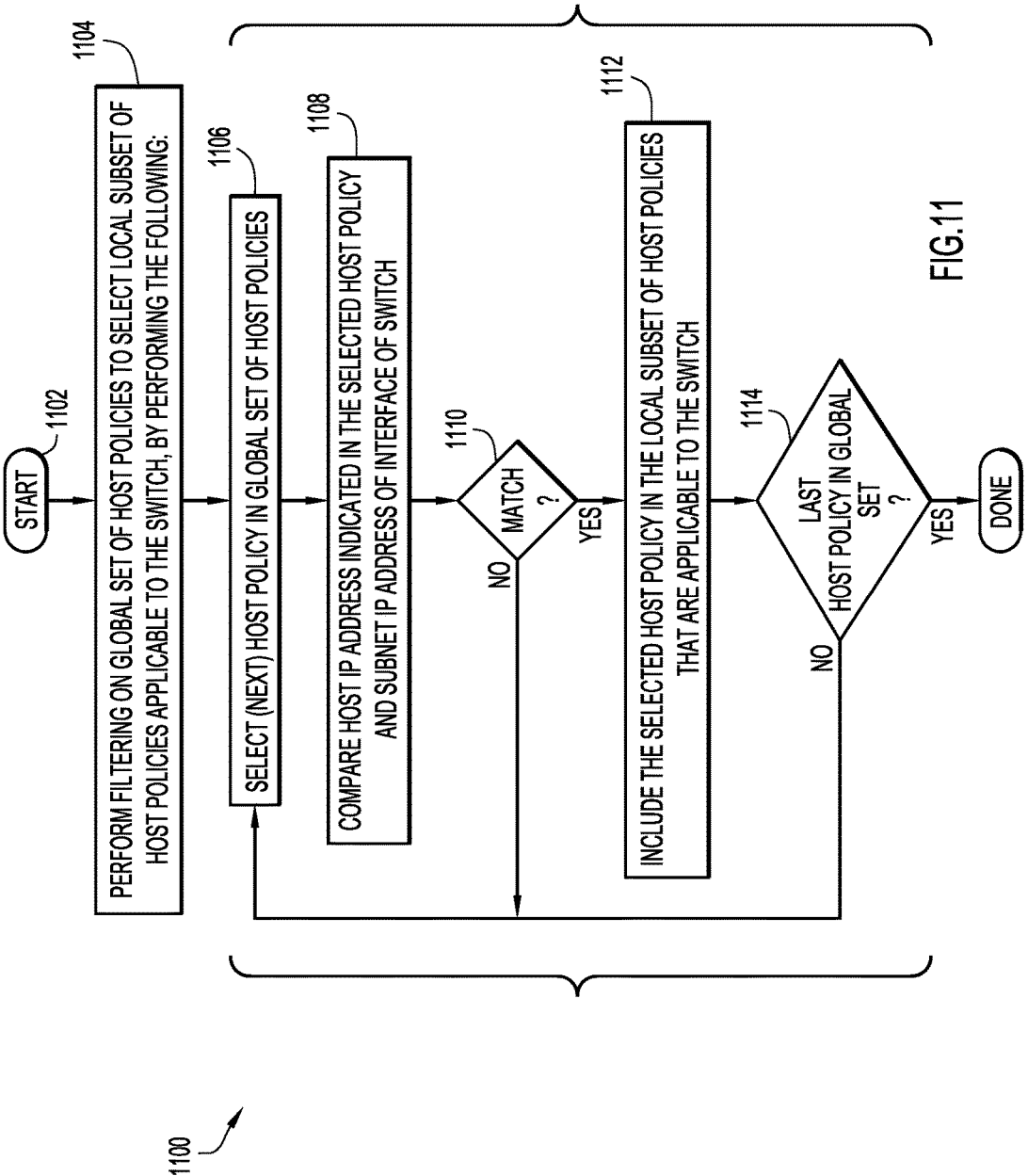
FIG. 11 is a flowchart for describing a method for use in host policy management in a network fabric according to some implementations of the present disclosure (e.g. a "filtering mechanism"), which may be performed by each one of a plurality of interconnected switches of the network fabric.

FIG. 11 is a flowchart for describing a method for use in host policy management in a network fabric according to some implementations of the present disclosure (e.g. a "filtering mechanism"). The network fabric may include a plurality of interconnected switches configured to facilitate communication of IP multicast traffic amongst host devices (see e.g. FIGS. 3, 4A-4B, 5A-5B, and 6A-6B), and use techniques for host policy management according to some implementations of the present disclosure.

The method of FIG. 11 may be performed by a network node, such as by each switch in the network fabric of interconnected switches. Each switch may include one or more processors, one or more memories coupled to the one or more processors, and one or more network/communication interfaces or ports. The method may be embodied as a computer program product including a non-transitory computer readable medium and instructions stored in the computer readable medium, where the instructions are executable on one or more processors of the switch for performing the steps of the method.

Beginning at a start block 1102 of FIG. 11, the switch may perform filtering on the received, global set of host policies to select the local subset of host policies applicable to the switch (step 1104 of FIG. 11). The filtering of step 1104 may be performed by executing the following steps. A host policy in the global set of host policies may be selected (step 1106 of FIG. 11). A host IP address corresponding to a host device indicated in the selected host policy and a subnet IP address of an interface of the switch may be compared (step 1108 of FIG. 11). If a match or other correspondence is identified (step 1110 of FIG. 11), then the selected host policy is included in the local subset of host policies (step 1112 of FIG. 11); otherwise, the next host policy in the global set is selected (step 1106 of FIG. 10). Steps 1106, 1108, 1110, and 1112 may be repeated for each next host policies in the global set of host policies, until the last or no further (unconsidered) host policy remains in the global set (as identified in step 1114 of FIG. 11).

In some implementations of the filtering in FIG. 11, the switch may operate to retain (e.g. not filter out) or include host sender policies of the global set, for use in granting or denying admission of host receiver devices to receive IP multicast traffic flows according to the one or more host sender policies of the global set (e.g. deny host receiver device based on attempt to access a previously-denied host sender device). Also, the switch may operate to retain (e.g. not filter out) or include any wildcard host policies (e.g. which may be applicable to all of the switches in the network fabric).

Figure 12:
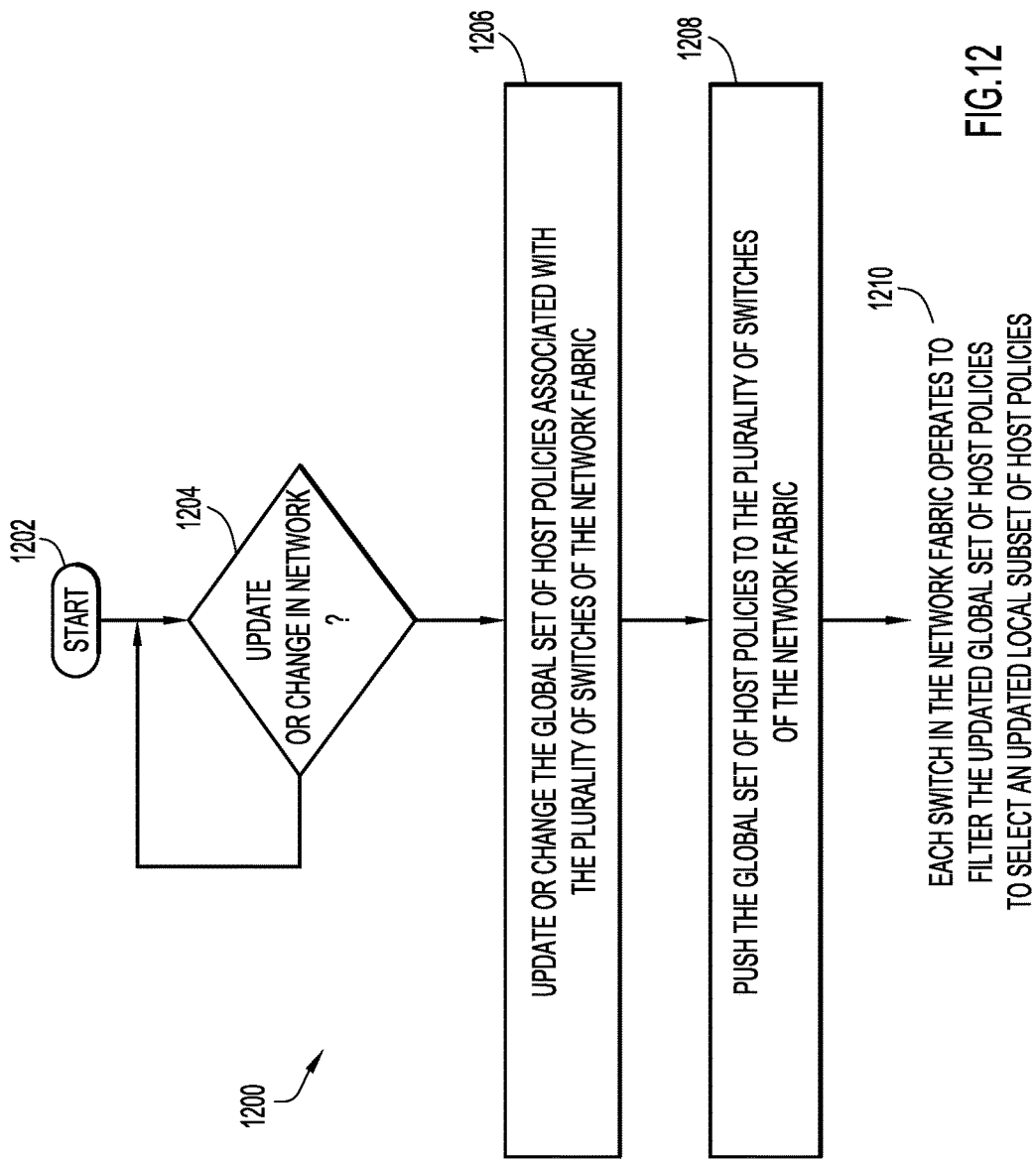
FIG. 12 is a flowchart for describing a method for use in host policy management in a network fabric according to some implementations of the present disclosure, which may be performed by a controller of the network fabric.

FIG. 12 is a flowchart 1200 for describing a method for use in host policy management in a network fabric according to some implementations of the present disclosure, which may be performed by a controller of the network fabric. The network fabric may include a plurality of interconnected switches configured to facilitate communication of IP multicast traffic amongst host devices (see e.g. FIGS. 3, 4A-4B, 5A-5B, and 6A-6B), using techniques for host policy management according to some implementations of the present disclosure.

The method of FIG. 12 may be performed by a network node, such as a controller for the network fabric which includes the plurality of interconnected switches. The controller may include one or more processors, one or more memories coupled to the one or more processors, and one or more network/communication interfaces or ports. The method may be embodied as a computer program product including a non-transitory computer readable medium and instructions stored in the computer readable medium, where the instructions are executable on one or more processors of the controller for performing the steps of the method.

Beginning at a start block 1202 of FIG. 12, the controller may detect or identify an update or change made in the network fabric (step 1204 of FIG. 12). For example, the update or change may be an update or change in network topology, link migration, IP address configuration change, or other. In response to detecting or identifying a topology change in the network fabric, the controller may update or change the global set of host policies associated with the plurality of switches of the network fabric (step 1206 of FIG. 12). The controller may push or otherwise send the updated global set of host policies to the plurality of switches of the network fabric (step 1208 of FIG. 12). Upon receipt of the updated global set, each switch in the network fabric may operate to filter the updated global set of host policies to select an updated local subset of host policies applicable to the switch (step 1210 of FIG. 12). Each switch may then grant or deny admission of host devices to receive or send IP multicast traffic flows in the network fabric according to the updated local subset of host policies.

Figure 1C:
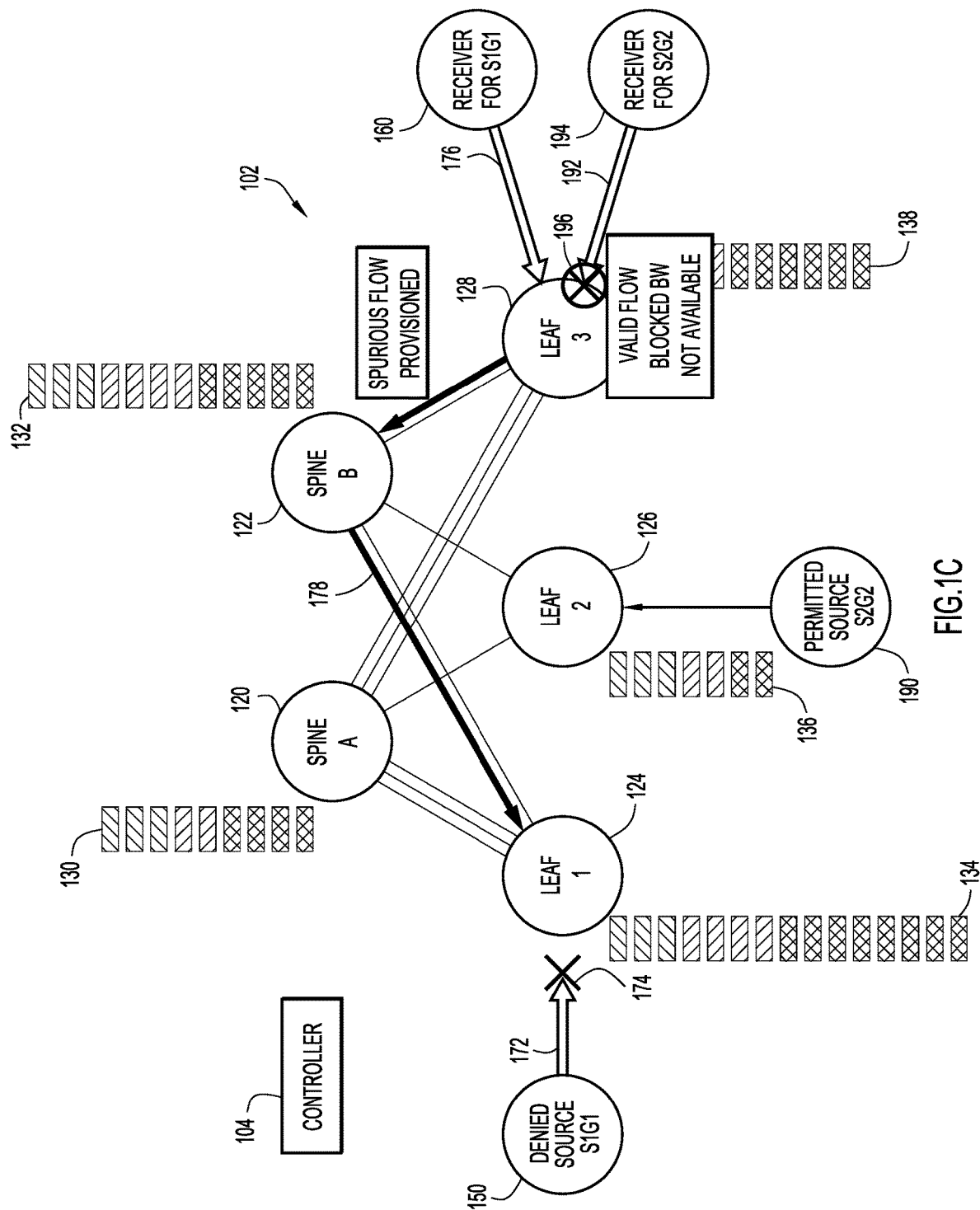
Figure 13:
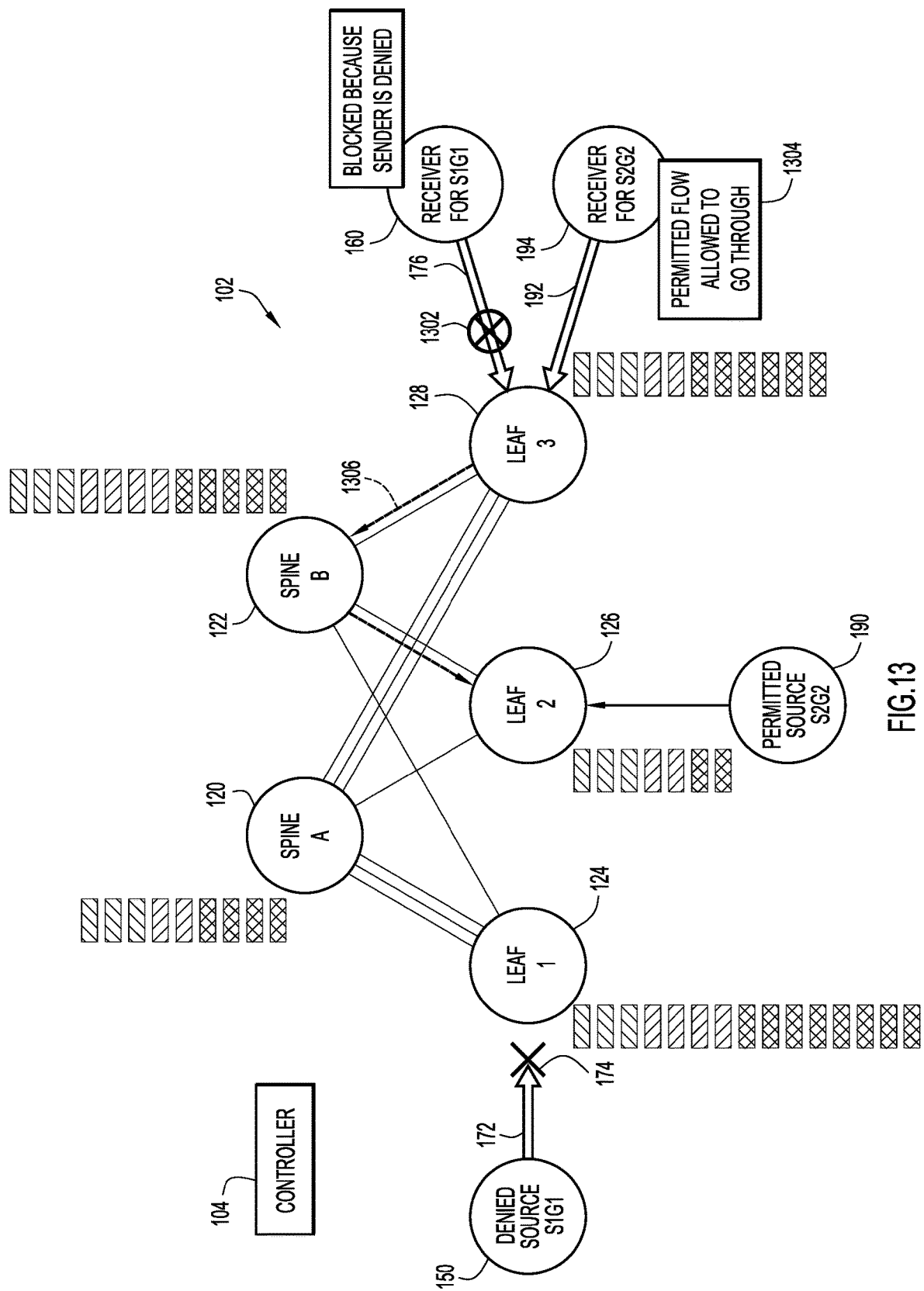
FIG. 13 is an illustrative representation of the network fabric which includes the plurality of interconnected switches and the controller in the scenario of FIG. 1C depicted earlier, for further describing a technique for host policy management according to some implementations of the present disclosure.

FIG. 13 is an illustrative representation of the network fabric 102 which includes the plurality of interconnected switches and the controller 104 from the scenario of FIG. 1C depicted earlier, for further describing a technique for host policy management according to some implementations of the present disclosure. Compare the discussion in relation to FIG. 1C above with the following. With use of such techniques, the previous request 176 (e.g. "V3 IGMP Join") from receiver 160 is advantageously blocked at switch 128 according to sender host policy (e.g. retained from the global set), and therefore the previous spurious flow provisioning (see FIG. 1C at 178) is prevented. The request 192 from receiver 194 for a flow from the permitted sender or source 190 may be advantageously permitted at 1304 so that a flow provisioning 1306 for the flow may be established.

Figure 14:
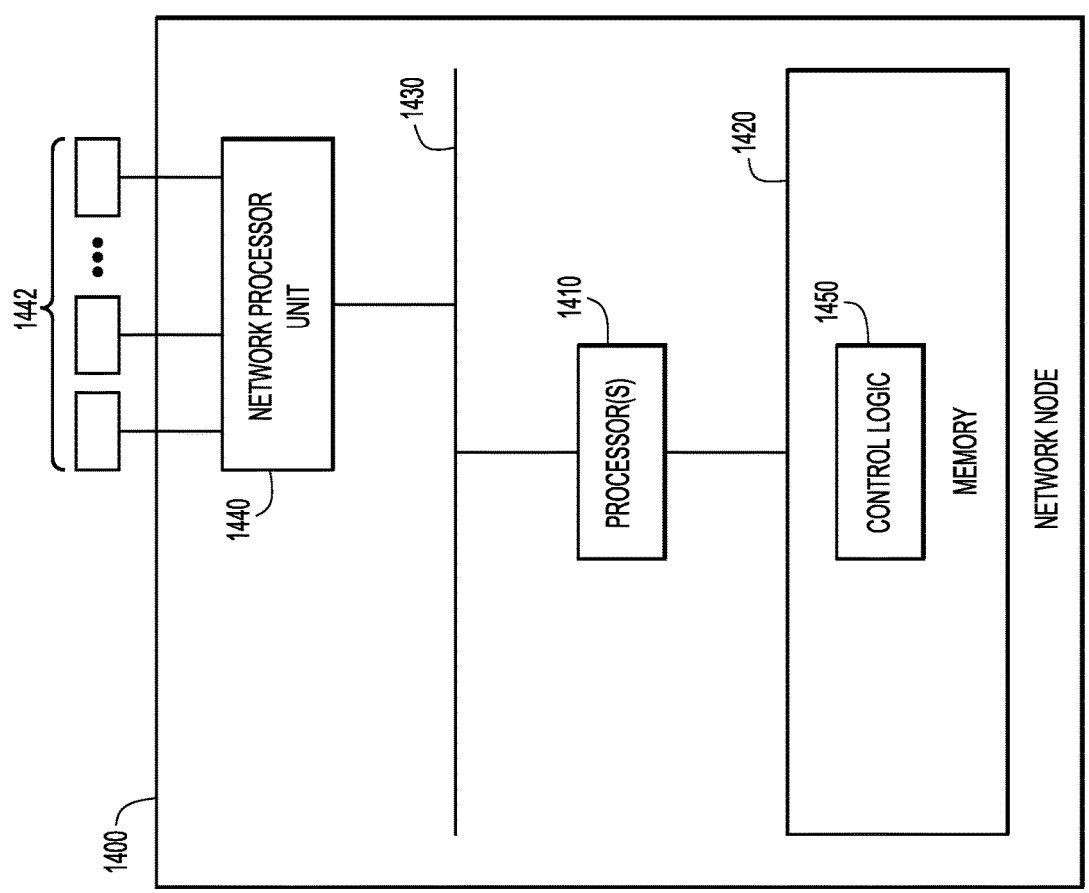
FIG. 14 illustrates a block diagram of a network node (e.g. a switch) configured to perform operations according to some implementations as described herein.

FIG. 14 illustrates a block diagram of a network node (e.g. a switch) configured to perform operations described above according to some implementations. The network node 1400 includes one or more processors 1410 for control, memory 1420, a bus 1430 and a network processor unit 1440. The processor 1410 may be a microprocessor or microcontroller. The network processor unit 1440 may include one or more Application Specific Integrated Circuits (ASICs), linecards, etc., and facilitates network communications between the node 1400 and other network nodes.

There are a plurality of network ports 1442 at which the node 1400 receives packets and from which the node 1400 sends packets into the network. The processor 1410 executes instructions associated with software stored in memory 1420. Specifically, the memory 1420 stores instructions for control logic 1450 that, when executed by the processor 1410, causes the processor 1410 to perform various operations on behalf of the node 1400 as described herein. The memory 1420 also stores configuration information 1460 received from a network controller to configure the network node according to desired network functions. It should be noted that in some embodiments, the control logic 1450 may be implemented in the form of firmware implemented by one or more ASICs as part of the network processor unit 1440.

The memory 1420 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 1420 may comprise one or more tangible (non-transitory) computer readable storage media (e.g., a memory device) encoded with software comprising computer executable instructions and when the software is executed (by the processor 1410) it is operable to perform certain network node operations described herein.

Figure 15:
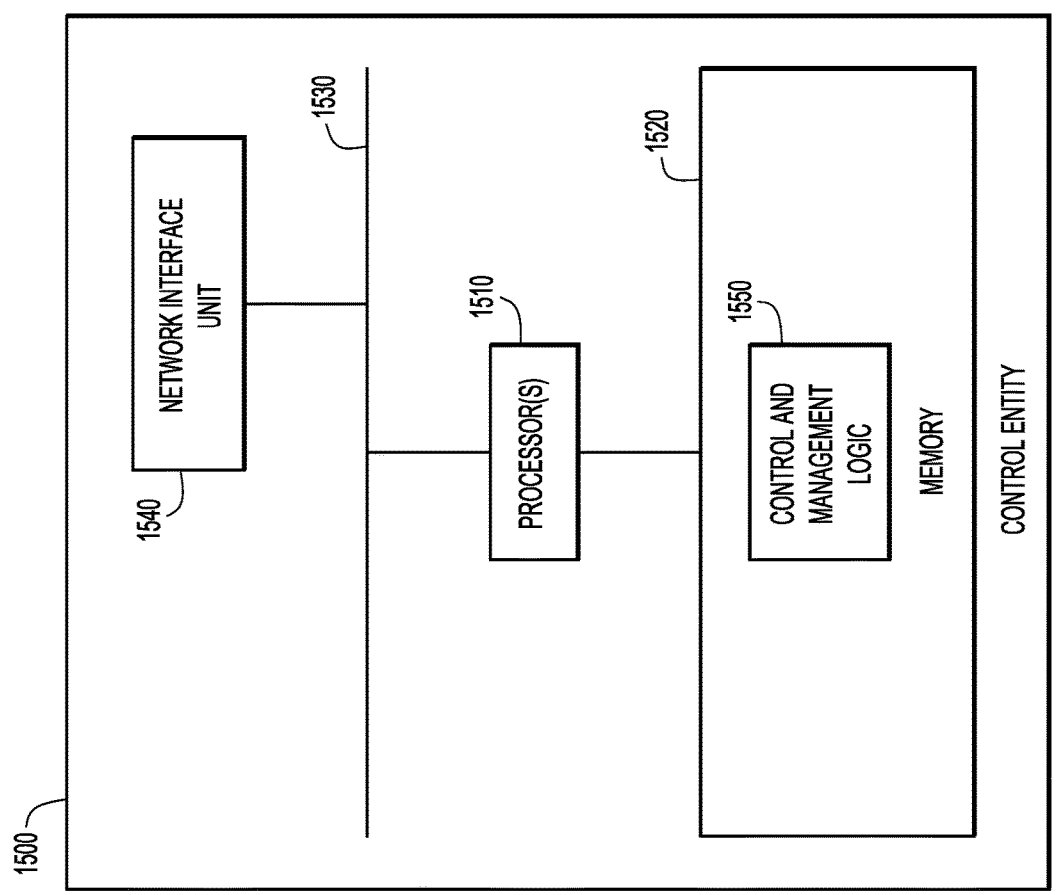
FIG. 15 illustrates a block diagram of a computing/control entity (e.g. a controller) that may perform the functions according to some implementations as described herein.

FIG. 15 illustrates a block diagram of a computing/control entity 1500 that may perform the functions of the controller as described herein. The computing/control entity 1500 includes one or more processors 1510, memory 1520, a bus 1530 and a network interface unit 1540, such as one or more network interface cards that enable network connectivity. The memory 1520 stores instructions for control and management logic 1550, that when executed by the processor 1510, cause the processor to perform the controller operations described herein.

The memory 1520 may include ROM of any type now known or hereinafter developed, RAM of any type now known or hereinafter developed, magnetic disk storage media devices, tamper-proof storage, optical storage media devices, flash memory devices, electrical, optical, or other physical/tangible memory storage devices. In general, the memory 1520 may comprise one or more tangible (non-transitory) computer readable storage media (e.g., a memory device) encoded with software comprising computer executable instructions and when the software is executed (by the processor 1510) it is operable to perform the network controller operations described herein.

Host admission policy and updates may be extremely challenging and error prone using prior techniques. What has been described herein are robust policy application schemes that are extremely simple for an administrator to configure and may be self-adapting to system changes. According to some implementations of the present disclosure, the same set of global host policies may be pushed to all of the switches in the network fabric, where each switch may create its own locally-applicable subset. During a change in the network (e.g. a topology change, link migration, IP address configuration change, or other), each switch may automatically update and apply the applied policy subset. A consulting of corresponding sender host policies on the receiver switch may avoid unnecessary flow programming and resource waste. Changes to host policies may be immediately applied to the switches in the network fabric. As the host policies and their application are in software, there are no hardware limitations as there is no dependence on ACLs.

Thus, what have been described are techniques for use in host policy management in a network fabric which includes a plurality of interconnected switches configured to facilitate communication of IP multicast traffic amongst host devices.

In one illustrative example, a switch for use in the network fabric may receive, from a controller, a global set of host policies associated with the plurality of switches of the network fabric. The global set of host policies may include host receiver policies and host sender policies. The switch may select, from the global set of host policies, a local subset of host policies applicable to the switch. The switch may then grant or deny admission of host devices to receive or send IP multicast traffic flows in the network fabric according to the selected, local subset of host policies.

Is some implementations, each one of the host policies may include a host IP address corresponding to a host device and a permission type which indicates "allowed" or "denied." In the selection or filtering process at each switch, for each one of a plurality of host policies of the global set, a host IP address associated with the host policy and a subnet IP address of an interface of the switch may be compared, where a host policy is included in the local subset based on the comparing.

In some implementations, the switch may retain host sender policies of the global set, for use in granting or denying admission of host receiver devices to receive IP multicast traffic flows according to the host sender policies of the global set. Also in some implementations, at least some host policies may be applicable to all host devices on all interfaces of all of the switches of the network fabric (e.g. always grant, or always deny); such a host policy may be referred to as a "wildcard" host policy, where there is no host IP address associated therewith.

In another illustrative example of the present disclosure, a controller for use in the network fabric may generate a global set of host policies associated with the plurality of switches of the network fabric. The controller may then push or otherwise send the global set of host policies to each switch of the plurality of switches. Upon receipt, each switch of the network fabric may operate to filter the global set of host policies to select a local subset of host policies applicable to the switch.

In yet another illustrative example of the present disclosure, a system may include a controller and a plurality of interconnected switches of a network fabric. The controller may be configured to generate and/or maintain a global set of host admission policies associated with the plurality of switches, and send the global set of host admission policies to each switch of the plurality of switches. Each switch may configured to receive, from the controller, the global set of host admission policies, and grant or deny admission of host devices to receive or send IP multicast traffic flows according to a filter, local subset of host admission policies from the global set. In some implementations, the global set of host admission policies may include one or more host receiver admission policies and one or more host sender admission policies, where each switch may be further configured to grant or deny admission of host receiver devices to receive IP multicast traffic flows according to the one or more host sender admission policies of the global set.

A product implementation which may utilize the techniques of the present disclosure may be an IP network multimedia data router (e.g. IP Fabric for Media), which may comprise a plurality of switches that are interconnected in a spine and leaf architecture. The plurality of switches may include K spine switches; K sets of L leaf switches; M data links between each leaf switch and each spine switch, where each data link is provided with a maximum link bandwidth of $BW_L$; and a plurality of bidirectional data ports connected to each leaf switch. The router may be provided or specified with a maximum number of bidirectional data ports $N=(a/K)\times(BW_L/BW_P)$ in order to provide a guaranteed, non-blocking IP multicast delivery of data at a maximum port bandwidth of $BW_P$, where K, L, M and "a" are constants, K≥2 and "a"≥K. In this architecture, at least some or all of the switches may operate to receive, from a controller, a global set of host policies associated with a plurality of switches of a network fabric; and grant or deny admission of host devices to receive or send IP multicast traffic flows in the network fabric according to a local subset of host policies selected from the global set.

As described previously, it has been one object of the present disclosure to reduce the number of spurious traffic flows that are provisioned using improved techniques for host policy management, so that the "guaranteed" nature of the guaranteed bandwidths of the router may be more fully realized or met. However, other objects of the present disclosure relate to implementations that do not provide those bandwidth guarantees, as the techniques may be applied to a wide variety of implementations. And again, the spine and leaf architecture is merely an illustrative example topology within which techniques of the present disclosure may be utilized; any suitable topology configuration, such as a single box topology, a mesh topology, a ring topology, etc., may be utilized.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, a first policy could be termed a second policy, and similarly, a second policy could be termed a first policy, without changing the meaning of the description, so long as all occurrences of the "first policy" are renamed consistently and all occurrences of the "second policy" are renamed consistently. The first policy and the second policy are both policies, but they are not the same policy.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a switch for use in a network fabric which includes a plurality of interconnected switches through which IP multicast traffic flows are provisioned for communicating IP multicast traffic amongst host devices,
   receiving a global set of host admission policies associated with the plurality of switches of the network fabric;
   filtering the global set of host admission policies to obtain a local subset of host admission policies applicable to host device interfaces of the switch, which includes filtering out host admission policies applicable to other host device interfaces of other switches of the plurality of switches of the network fabric; and
   granting or denying admission of host devices to receive or send IP multicast traffic flows in the network fabric based on consulting the local subset of host admission policies.

2. The method of claim 1, further comprising:
   publishing or exporting to a controller the local subset of host admission policies.

3. The method of claim 1, wherein filtering out the host admission policies applicable to the other host device interfaces of the other switches further comprises:
   for each one of a plurality of host receiver admission policies in the global set,
      comparing a host IP address of the host receiver admission policy and a subnet IP address of a host device interface of the switch; and
      selecting the host receiver admission policy for inclusion in the local subset of host admission policies based on the comparing.

4. The method of claim 1, wherein receiving the global set of host admission policies comprises receiving the same global set of host admission policies received by at least some of the other switches in the network fabric.

5. The method of claim 1, wherein the filtering comprises filtering upon receipt of the global set of host admission policies.

6. The method of claim 1, wherein the granting or denying further comprises:
   receiving from a host device a request to join an IP multicast traffic flow; and
   consulting one or more host admission policies of the local subset of host admission policies in the granting or denying of admission of the host device.

7. The method of claim 1, wherein:
   filtering the global set of host admission policies further comprises retaining in the local subset of host admission policies a plurality of host sender admission policies from the global set, and
   granting or denying admission of the host devices to receive IP multicast flows in the network fabric is further based on consulting the plurality of host sender admission policies in the local subset of host admission policies.

8. The method of claim 1, wherein:
   filtering the global set of host admission policies further comprises retaining in the local subset of host admission policies a plurality of wildcard host admission policies from the global set; and
   granting or denying admission of the host devices to receive IP multicast flows in the network fabric is further based on consulting the plurality of wildcard host admission policies in the local subset of host admission policies.

9. The method of claim 1, further comprising:
   in response to a topology change in the network fabric, receiving an updated global set of host admission policies associated with the plurality of switches of the network fabric;
   filtering the updated global set of host admission policies to obtain an updated local subset of host admission policies applicable to the host device interfaces of the switch, which includes filtering out host admission policies applicable to the other host device interfaces of the other switches of the plurality of switches of the network fabric; and
   granting or denying admission of host devices to receive or send IP multicast traffic flows in the network fabric based on consulting the updated local subset of host admission policies.

10. The method of claim 1, wherein the plurality of switches are interconnected in a spine and leaf node architecture of an IP network media data router configured to provide IP multimedia delivery with guaranteed bandwidths.

11. The method of claim 1, wherein the receiving comprises receiving the global set of host admission policies from a controller of the network fabric.

12. A switch comprising:
    one or more processors;
    a plurality of switch interfaces configured to connect with a plurality of switches of a network fabric through which IP multicast traffic flows are provisioned for communicating IP multicast traffic amongst host devices;
    a plurality of host device interfaces configured to connect with a plurality of host devices;
    one or more processors being configured to:
       receive, from a controller, a global set of host admission policies associated with the plurality of switches of the network fabric;
       filter the global set of host admission policies to obtain a local subset of host admission policies applicable to the host device interfaces of the switch, which includes filtering out host admission policies applicable to other host device interfaces of other switches of the plurality of switches of the network fabric; and grant or deny admission of host devices to receive or send IP multicast traffic flows in the network fabric based on consulting the local subset of host admission policies.

13. The switch of claim 12, wherein the one or more processors are configured to:
publish or export to a controller the local subset of host admission policies for viewing.

14. The switch of claim 13, wherein the one or more processors are further configured to filter out the host admission policies applicable to the other host device interfaces of the other switches by:
for each one of a plurality of host receiver admission policies in the global set,
compare a host IP address of the host receiver admission policy and a subnet IP address of a host device interface of the switch
select the host receiver admission policy for inclusion in the local subset of host admission policies based on the compare.

15. The switch of claim 14, wherein each one of the host receiver admission policies in the global set includes a host IP address and a permission type which indicates "allowed" or "denied".

16. The switch of claim 12, wherein the one or more processors are further configured to, in response to a topology change in the network fabric:
receive an updated global set of host admission policies associated with the plurality of switches of the network fabric;
filter the updated global set of host admission policies to obtain an updated local subset of host admission policies applicable to the host device interfaces of the switch, which includes filtering out host admission policies applicable to the other host device interfaces of the other switches of the plurality of switches of the network fabric; and
grant or deny admission of host devices to receive or send IP multicast traffic flows in the network fabric based on consulting the updated local subset of host admission policies.

17. The switch of claim 12, which is configured for use with the plurality of switches interconnected in a spine and leaf node architecture of an IP network media data router configured to provide IP multimedia delivery with guaranteed bandwidths.

18. The switch of claim 12, wherein the one or more processors are further configured to:
filter the global set of host admission policies by retaining in the local subset of host admission policies a plurality of host sender admission policies from the global set, and
grant or deny admission of host devices to receive IP multicast traffic flows in the network fabric further based on consulting the plurality of host sender admission policies in the local subset of host admission policies.

19. A system comprising:
a controller;
a plurality of switches configured to interconnect with each other in a network fabric, and configured to be provisioned with IP multicast traffic flows for communicating IP multicast traffic amongst host devices;
the controller being configured to:
maintain a global set of host admission policies associated with the plurality of switches;
send the global set of host admission policies to each switch of the plurality of switches;
each switch being configured to:
receive, from the controller, the global set of host admission policies;
filter the global set of host admission policies to obtain a local subset of host admission policies applicable to host device interfaces of the switch, which includes filtering out host admission policies applicable to other host device interfaces of other switches of the plurality of switches; and
grant or deny admission of host devices to receive IP multicast flows in the network fabric based on consulting the local subset of the host admission policies.

20. The system of claim 19, wherein:
each switch is configured to filter the global set of host admission policies by retaining in the local subset of host admission policies a plurality of host sender admission policies from the global set, and
each switch is configured to grant or deny admission of host devices to receive IP multicast flows further based on consulting the host sender admission policies in the local subset of host admission policies.

* * * * *